United States Patent
Kurisaki et al.

Patent Number: 5,598,273
Date of Patent: Jan. 28, 1997

[54] RECORDING CONTROL DEVICE AND METHOD UTILIZING A TEST SIGNAL HAVING MULTIPLE FREQUENCIES

[75] Inventors: Kazuhiro Kurisaki; Yoshikazu Kanazawa; Yoshiaki Mimura, all of Nagaokakyo, Japan

[73] Assignee: Mitsubishi Denki Kabushiki Kaisha, Tokyo, Japan

[21] Appl. No.: 519,014

[22] Filed: Aug. 24, 1995

Related U.S. Application Data

[63] Continuation of Ser. No. 92,216, Jul. 16, 1993, abandoned.

[30] Foreign Application Priority Data

Jul. 17, 1992 [JP] Japan ................. 4-190864
Sep. 16, 1992 [JP] Japan ................. 4-246323

[51] Int. Cl.$^6$ ........................ H04N 5/782
[52] U.S. Cl. ........................ 386/9; 386/13
[58] Field of Search ................ 358/335, 315, 358/330, 327, 310, 318; 360/27, 33.1, 9.1; H04N 5/782

[56] References Cited

U.S. PATENT DOCUMENTS

| | | | |
|---|---|---|---|
| 4,807,056 | 2/1989 | Sasaki et al. | 360/27 |
| 4,956,726 | 9/1990 | Takimoto et al. | 358/310 |
| 5,077,623 | 12/1991 | McSweeney | 360/27 |
| 5,140,435 | 8/1992 | Suzuki et al. | 358/335 |
| 5,257,109 | 10/1993 | Minakawa | 358/327 |
| 5,296,929 | 3/1994 | Marimoto | 358/340 |
| 5,311,373 | 5/1994 | Murabayashi et al. | 360/27 |

FOREIGN PATENT DOCUMENTS

| | | |
|---|---|---|
| 0481824 | 4/1992 | European Pat. Off. . |
| 63-081603 | 4/1988 | Japan . |
| 63-146674 | 6/1988 | Japan . |
| 63-234402 | 9/1988 | Japan . |
| 1217705 | 8/1989 | Japan . |
| 2187902 | 7/1990 | Japan . |
| 3245302 | 10/1991 | Japan . |
| 426902 | 1/1992 | Japan . |
| 04205904 | 7/1992 | Japan . |

*Primary Examiner*—Thai Q. Tran
*Assistant Examiner*—Huy Nguyen

[57] ABSTRACT

In a magnetic recording control device, a plurality of test signals of different frequencies are recorded on and reproduced from a magnetic recording medium, and the reproduction levels of the test signals are detected. From the detection results, the frequency characteristics and electromagnetic conversion characteristics of the magnetic recording medium are judged. A frequency correction in accordance with the judged frequency characteristics, and a record level correction in accordance with the judged electro-magnetic conversion characteristics are conducted on a video signal to be recorded.

46 Claims, 16 Drawing Sheets

RECORDING CONTROL DEVICE AND METHOD UTILIZING A TEST SIGNAL HAVING MULTIPLE FREQUENCIES

This application is a continuation of application Ser. No. 08/092,216 filed on Jul. 16, 1993, now abandoned.

BACKGROUND OF THE INVENTION

1. Field of the Invention

This invention relates to a magnetic recording control device which controls the frequency characteristics and record level of a signal to be recorded on a magnetic recording medium such as a magnetic tape, in accordance with the characteristics of the magnetic recording medium.

2. Description of the Related Art

Conventionally, in order to improve the quality of a reproduced image, a domestic video tape recorder (VTR) is provided with a recording current controller by which the recording current flowing through a recording head coil in the recording process is set to a level for obtaining a reproduced voltage of the maximum level. When a reproduced voltage of the maximum level is obtained in the reproduction process, the quality of a reproduced image can be improved. The recording current from which the maximum reproduced voltage is obtained is called the optimum recording current (ORC).

Even in VTRs of the same kind, the value of the ORC varies depending on the scattering of the characteristics of magnetic tapes and magnetic heads. Owing to the time aging of magnetic tapes and magnetic heads, the change of the ORC also occurs. Furthermore, depending on the performance of a magnetic tape, the value of the ORC differs with the frequency of the recording signal.

In the prior art, therefore, considering causes of the scattering of the ORC, an average value of the ORC is previously obtained, and this average ORC is applied to all mass-produced VTR sets and magnetic tapes, so that video signals are recorded with a constant recording current irrespective of the performances of the used VTR and magnetic tape. In the reproduction of the recorded video signals, hence, there may arise a case where the optimum characteristics cannot be obtained, according to the performances of the used VTR and magnetic tape. In such a case, a reproduced image may be reversed or a predetermined S/N ratio may not be attained.

In order to prevent such phenomena from occurring, a recording current control device having the configuration shown in FIG. 1 has been proposed (Japanese patent Application Laid-Open HEI 2-187902 (1990)). In the proposed device, a test signal is recorded in advance of the recording process on a magnetic tape to which the recording and reproduction processes are to be done, and the voltage reproduced from the magnetic tape is measured, whereby the ORC is determined.

In FIG. 1, 71 designates a recording head for recording the signal used for the ORC detection, 72 designates a magnetic tape, 73 and 79 designate rotary transformers, 74 designates a record amplifier, and 75 designates a gain switching controller which conducts the gain switch control on the record amplifier 74. The reference numeral 76 designates a comparison/decision unit which compares a plurality of input DC potentials with each other and, on the basis of the comparison result, gives the gain switching controller 75 instructions for the gain setting, and 78 designates a reproduction head which reproduces signals recorded on the magnetic tape 72 by the recording head 71. The reference numeral 80 designates a preamplifier, and 77 designates a detector which smooths the output of the preamplifier 80 and converts it to a DC potential.

Next, the operation of the control device will be described. In the recording process, a signal which has been amplified by the record amplifier 74 is supplied through the rotary transformer 73 to the recording head 71 and recorded on the magnetic tape 72. This recording is conducted in several different recording currents in accordance with instructions from the gain switching controller 75. In the reproduction process, the signals recorded on the magnetic tape 72 are detected by the reproduction head 78, and supplied through the rotary transformer 79 to the preamplifier 80. The signals which have been amplified by the preamplifier 80 are supplied to the detector 77 which in turn detects the output signals of the preamplifier 80 to smooth them. The smoothed signals are sent to the comparison/decision unit 76. The comparison/decision unit 76 compares the potential levels of the plural input signals with each other to find the ORC.

The recording current control device can set the ORC in accordance with the performance of the kind of the magnetic tape selected from magnetic tapes of different performances, thereby in a reproduced image enabling a predetermined S/N ratio to be attained. However, the control device has a problem in that, since the test signal has a single frequency, video signals are recorded without considering the frequency characteristics of the used magnetic tape and therefore the frequency characteristics of the recorded video signal are scattered. Although the ORCs of various magnetic tapes and magnetic heads may be correctly determined, such ORCs are those for a single frequency. Therefore, it is impossible to measure a correct ORC for a frequency-multiplexed signal such as a color signal. As a result, the electro-magnetic conversion characteristics are scattered, causing reproduced images to be scattered in image quality.

Video signals are previously FM-modulated and then recorded on a magnetic tape, in order to facilitate the recording of their information signals on the tape. The recorded signals are reproduced by the reproduction head and then demodulated to be output as reproduced video signals. The reproduction head outputs and the reproduced video signals vary in level in accordance with their frequency band.

FIG. 2 is a graph showing the frequency characteristics of two kinds of magnetic tapes in which outputs of the reproduction head for reproduced FM signals vary in level in accordance with their frequency bands. FIG. 3 is a graph showing the frequency characteristics of the two kinds of magnetic tapes for demodulated reproduced video signals. From FIG. 2, it will be noted that the variation of the outputs of the reproduction head increases in level as the frequency becomes higher and the frequency characteristics of B tape is inferior to those of A tape. In contrast, from FIG. 3, it will be noted that B tape has inferior S/N ratio and superior frequency characteristics as compared with A tape because the level variation of video signals reproduced from B tape is small as compared with that of video signals reproduced from A tape. From the above, it will be noted that the frequency characteristics of reproduced video signals vary in accordance with the performance of a magnetic tape, and that A tape with the high performance has superior S/N ratio and inferior frequency characteristics.

When a video signal is corrected so that the side-band components produced in the FM modulation are emphasized and then recorded, a reproduced signal having improved frequency characteristics can be obtained. Therefore, in a conventional VTR, a video signal which has been corrected is recorded. The amount of this correction is fixed regardless of the kind of a magnetic tape, or set so as to conform to a normal magnetic tape or a magnetic tape having a low performance. As described above, however, the frequency characteristics vary in accordance with the performance of a magnetic tape, and, as the magnetic tape has the higher performance, the frequency characteristics of the output of a reproduction head become more inferior. Conventionally, therefore, when a video signal which is to be recorded on a magnetic tape having a high performance, the correction is insufficiently conducted. In order to solve this problem, the side-band components may be more emphasized when the magnetic tape has the higher performance, so that the video signal has more superior frequency characteristics, thereby further improving the quality of a reproduced image. When the same correction is conducted on a video signal which is to be recorded on a magnetic tape having a low performance, however, a reproduced image may be reversed or the S/N ratio may be lowered.

As described above, in the prior art, there is a problem in that the correction of the frequency characteristics is not conducted in accordance with the performance of a magnetic tape and therefore the best image quality for the magnetic tape cannot be obtained.

SUMMARY OF THE INVENTION

It is an object of the invention to provide a magnetic recording control device which controls the correction of the frequency characteristics in accordance with a used magnetic tape so that the scattering of the quality of a reproduced image depending on the frequency characteristics is reduced, the reversion of an image is prevented from occurring, and a predetermined S/N ratio can be ensured, thereby enabling an excellent image quality in accordance with the performance of the magnetic tape to be obtained.

It is another object of the invention to provide a magnetic recording control device which can correctly measure and obtain the electro-magnetic conversion characteristics of a color signal, suppress the deterioration of the S/N ratio of a reproduced color signal owing to the scattering of the performance of magnetic leads and magnetic tapes, and obtain a high definition image quality.

It is a further object of the invention to provide a magnetic recording control device which can change the record levels of a color signal and a luminance signal in accordance with the electro-magnetic conversion characteristics, reduce the scattering of the electro-magnetic conversion characteristics, suppress the deterioration of the S/N ratio, and obtain a high definition image quality in taking out the performance of tape at its maximum.

It is a still further object of the invention to provide a magnetic recording control device which can judge in the reproduction process the electro-magnetic conversion characteristics of a color signal and a luminance signal on the basis of the judgment of the levels of the signals, change the record levels of the signals, and prevent the deterioration of the quality of a reproduced image owing to the scattering of the performance of magnetic heads and magnetic tapes, from occurring.

In a first magnetic recording control device according to the invention, a plurality of test signals of different frequencies are generated and recorded on a magnetic recording medium such as a magnetic tape, and then reproduced therefrom. The reproduction levels of the test signals are detected and stored. The frequency characteristics of the magnetic recording medium are judged from the stored contents. The correction amount of the frequency characteristics which corresponds to the magnetic recording medium is determined, and then video signals to be recorded are corrected. Therefore, the frequency characteristics can be corrected in accordance with the performance of the used magnetic recording medium.

When the first magnetic recording control device is applied to for example an S-VHS type magnetic recording/reproduction apparatus, the plurality of test signals may include a first test signal which is a clock signal generated by a control unit of the magnetic recording/reproduction apparatus, and a second test signal which is an n-multiple of the first test signal. Alternatively, the plurality of test signals may include a first test signal which is the subcarrier frequency signal of a chrominance signal generated by a color processing unit of the magnetic recording/reproduction apparatus, and a second test signal which is an n-multiple of the first test signal. In such a control device, the test signal of the higher-frequency region is recorded on and reproduced from a magnetic recording medium, the frequency characteristics of the magnetic recording medium in the higher-frequency region are detected, and the frequency characteristics are corrected corresponding to the performance of the magnetic recording medium and conforming to S-VHS.

When the first magnetic recording control device is applied to for example a VHS type magnetic recording/reproduction apparatus, the plurality of test signals may include a first test signal which is a clock signal generated by a control unit of the magnetic recording/reproduction apparatus, and a second test signal which is all n-demultiple of the first test signal. Alternatively, the plurality of test signals may include a first test signal which is the subcarrier frequency signal of a chrominance signal generated by a color processing unit of the magnetic recording/reproduction apparatus, and a second test signal which is an n-demultiple of the first test signal. In such a control device, test signals of the low frequency region are recorded on and reproduced from a magnetic recording medium, the frequency characteristics of the magnetic recording medium in the low frequency region are detected, and the frequency characteristics are corrected corresponding to the performance of the magnetic recording medium and conforming to VHS.

In a second magnetic recording control device according to the invention, two test signals of different frequencies respectively corresponding to a luminance signal and a color signal which are separated from a video signal, the test signals are mixed with each other and recorded on a magnetic recording medium while being frequency-multiplexed. In the reproduction process, reproduction levels of the test signals are detected, and the detected reproduction levels are stored. The electro-magnetic conversion characteristics of the color signal are judged from the stored contents. The record level of the color signal to be recorded is corrected in accordance with the judging results.

In the second magnetic recording control device, the electro-magnetic conversion characteristics of each of the color signal and the luminance signal may, be judged, and the record levels of the color signal and the luminance signal may be independently corrected in accordance with the judging results.

In a third magnetic recording control device according to the invention, a luminance signal and a color signal which are separated from a video signal are mixed with each other and recorded on a magnetic recording medium while being frequency-multiplexed. In the reproduction process, the reproduction level of the luminance signal is detected by gating the synchronizing portion of the luminance signal, and the reproduction level of the color signal is detected by gating the burst portion of the color signal. The electromagnetic conversion characteristics of the luminance signal and color signal are judged from the detection results. The record levels of the luminance signal and color signal to be recorded are changed in accordance with the judging results.

The above and further objects and features of the invention will more fully be apparent from the following detailed description with accompanying drawings.

DESCRIPTION OF THE PREFERRED EMBODIMENTS

Hereinafter, the invention will be described in detail with reference to the drawings showing its embodiments.
Embodiment 1

Figure 1:
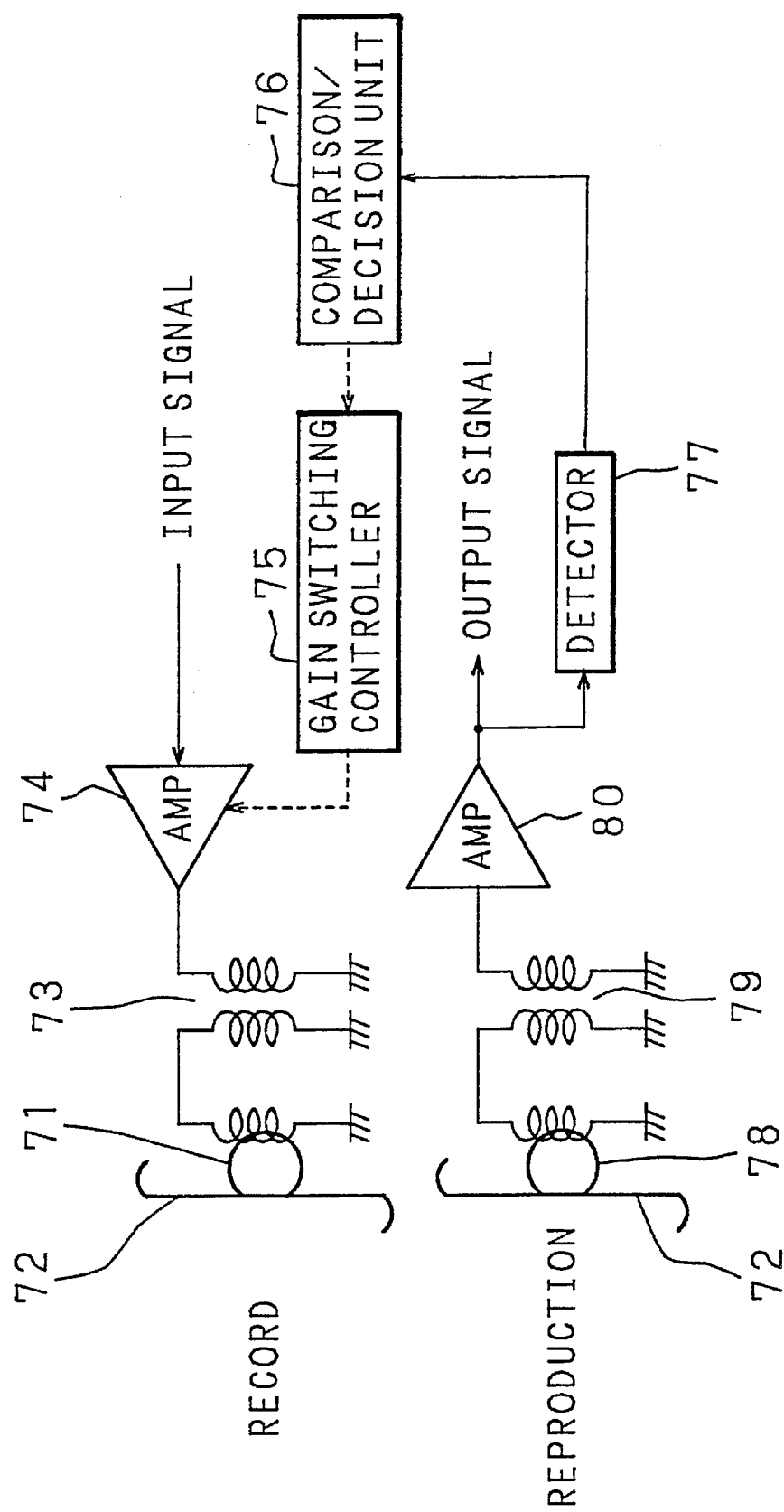
FIG. 1 is a diagram showing the configuration of a prior art recording current control device.
Figure 2:
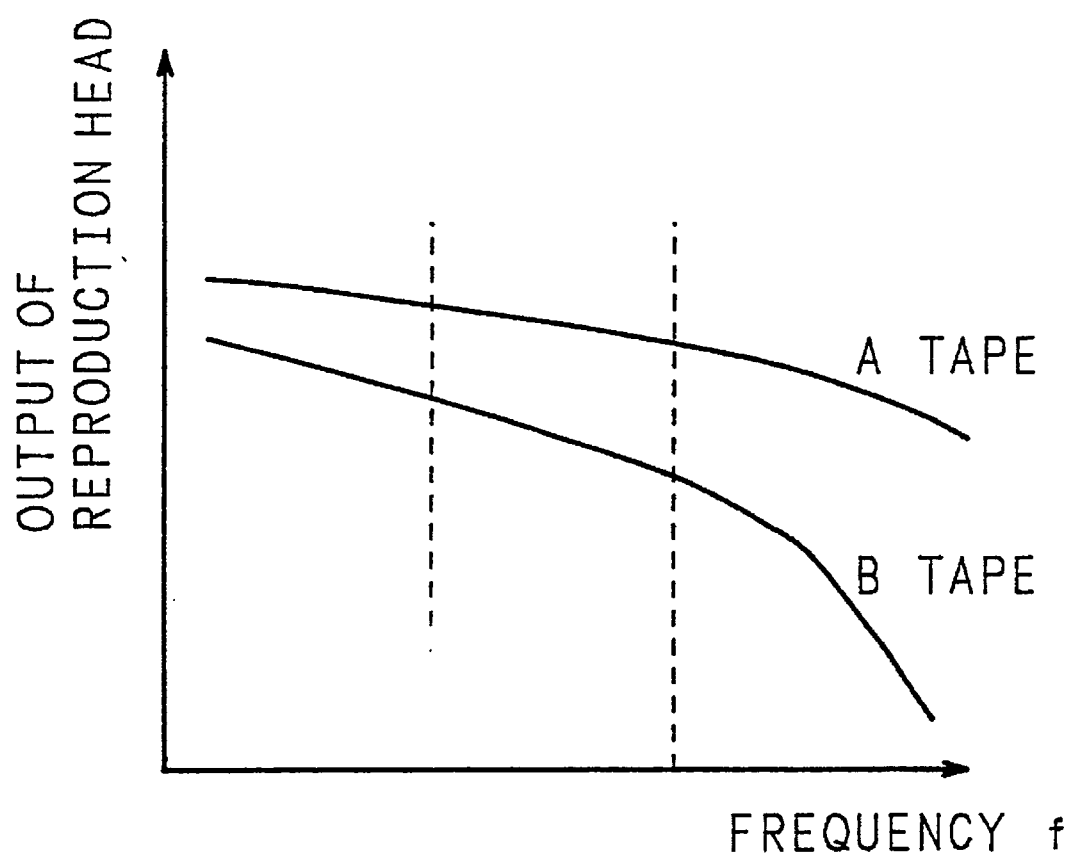
FIG. 2 is a graph showing the frequency characteristics where reproduction head outputs of video signals which have been FM-modulated and recorded vary in level in accordance with the frequency band.
Figure 3:
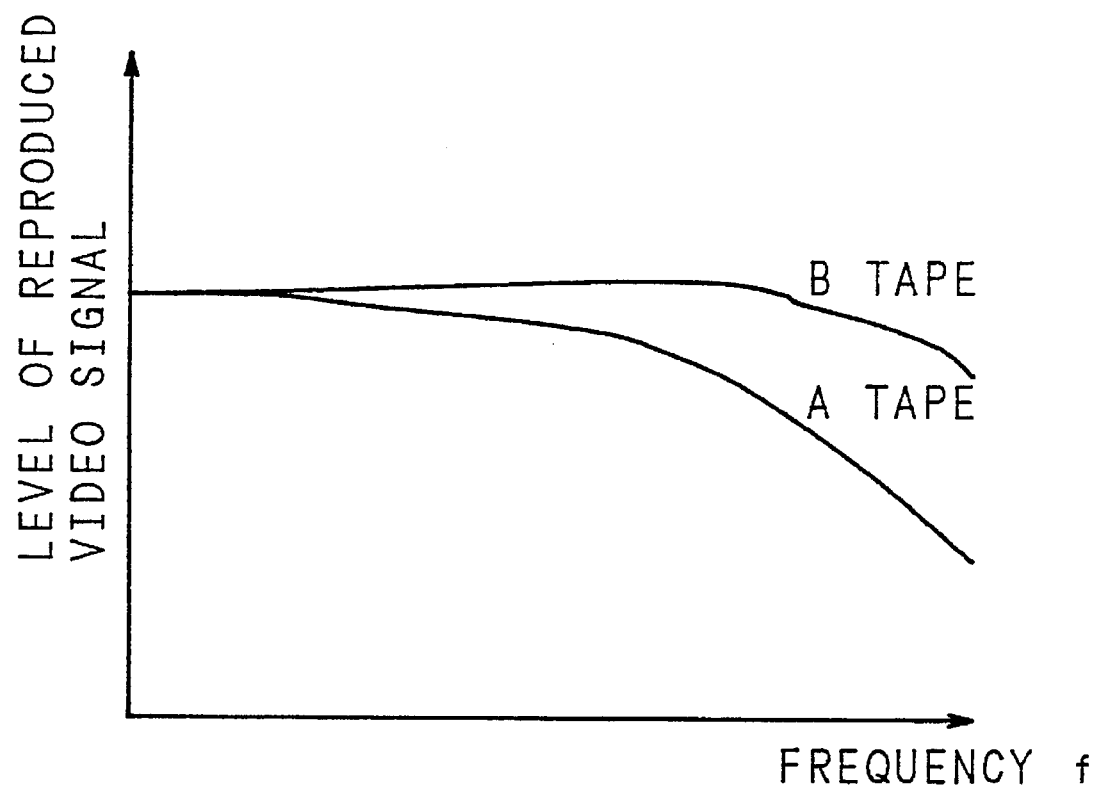
FIG. 3 is a graph showing the frequency characteristics of reproduced video signals.
Figure 4:
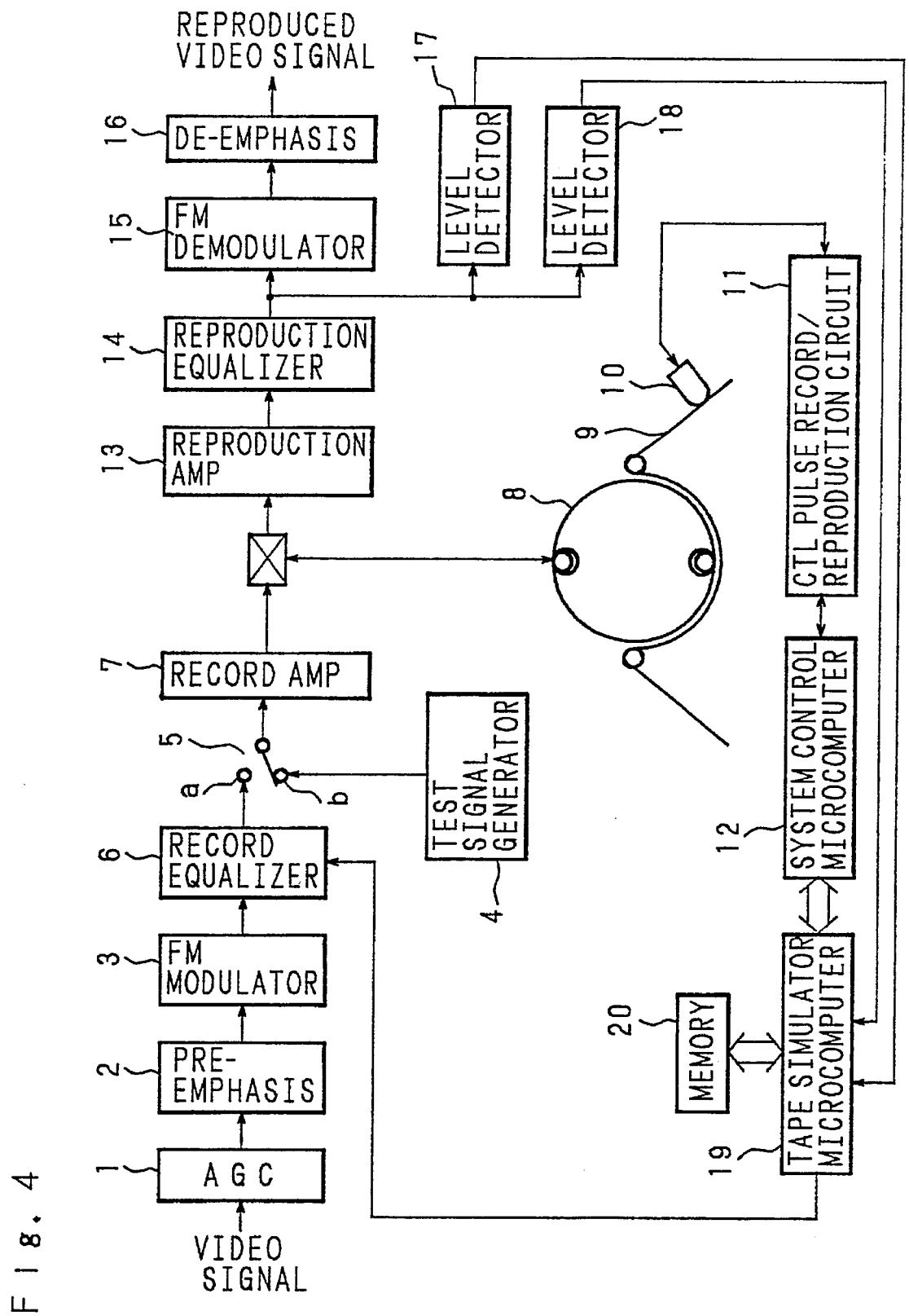
FIG. 4 is a block diagram showing the configuration of a magnetic recording control device according to the invention.

FIG. 4 is a block diagram showing the configuration of Embodiment 1 of the invention. In the figure, 1 designates an AGC (automatic gain controller) which receives a video signal to be recorded and makes its level constant. The output signal of the AGC 1 is supplied to a pre-emphasis 2 which in turn amplifies largely the higher-frequency portion of the input signal and sends the amplified signal to an FM modulator 3. The FM modulator 3 modulates the signal with emphasized the higher-frequency portion of the signal and supplies the FM-modulated output signal to a record equalizer 6. The record equalizer 6 corrects the frequency characteristics of the FM-modulated wave of the video signal. The output of the record equalizer 6 is supplied to a record amplifier 7 through a switch 5 in which the contact is switched to a terminal a side.

A test signal generator 4 is a circuit which generates two test signals F1 and F2 and outputs the two test signals F1 and F2 at the same time. The two test signals F1 and F2 have frequencies f1 and f2, respectively, and are supplied to the record amplifier 7 when the contact of the switch 5 is switched to a test terminal b side. The changeover of the switch 5 is conducted under instructions from a system control microcomputer 12 which will be described later. The record amplifier 7 amplifies an input signal, and the amplified signal is supplied to a rotary magnetic head 8 and then recorded on a magnetic tape 9.

The recorded signal is reproduced by the rotary magnetic head 8, and the reproduced signal is then supplied to a reproduction amplifier 13. The output signal of the reproduction amplifier 13 is supplied to a reproduction equalizer 14 which corrects the frequency characteristics of the reproduced signal. The output signal of the reproduction equalizer 14 is supplied to an FM demodulator 15 and also to level detectors 17 and 18. The reproduced signal supplied to the FM demodulator 15 is demodulated therein and then sent to a de-emphasis 16. In the de-emphasis 16, the higher-frequency portion of the signal amplified in the pre-emphasis 2 is returned to the original level. The signal which has been processed in the de-emphasis 16 is output as a reproduced video signal.

On the other hand, front the signals which are reproduced from the recorded test signals F1 and F2 and supplied to the level detectors 17 and 18, signals respectively having frequency spectrums of f1 and f2 are produced, and the levels thereof are measured. Data indicative of the levels of the reproduced signals are sent to a tape simulator microcomputer 19. A memory 20 storing a program for determining a correction amount suitable to the frequency characteristics is connected to the tape simulator microcomputer 19. In accordance with the program, the tape simulator microcomputer 19 controls the frequency characteristics of the video signal. The level data of the reproduced signals front the level detectors 17 and 18 are supplied to the tape simulator microcomputer 19, and stored in the memory 20. Then, the tape simulator microcomputer 19 supplies a signal for conducting the correction of the frequency characteristics which has been determined on the basis of the recorded signals, to the record equalizer 6.

The tape simulator microcomputer 19 is connected also to the system control microcomputer 12. The system control microcomputer 12 controls the operation of the magnetic recording/reproduction apparatus, and supplies a signal instructing the recording of an index signal on the magnetic tape 9, to a CTL pulse record/reproduction circuit 11 in the timing of recording the test signals onto the magnetic tape 9. The CTL pulse record/reproduction circuit 11 generates a CTL pulse signal of a fixed period which is used for making the magnetic tape 9 run constantly, and amplifies the signal. The CTL pulse record/reproduction circuit 11 outputs the index signal in accordance with a specific timing of the CTL pulse signal, and the index signal is input to a control head 10.

The control head 10 records the CTL pulse signal and index signal in and then reproduces from the control track of the magnetic tape 9. The index signal is recorded in the control track which precedes the portion for recording the test signals. The CTL pulse signal and index signal recorded on the magnetic tape 9 are reproduced by the control head 10. The reproduced signals are supplied to the CTL pulse record/reproduction circuit 11. The output of the circuit 11 is supplied to the system control microcomputer 12.

Figure 5A:
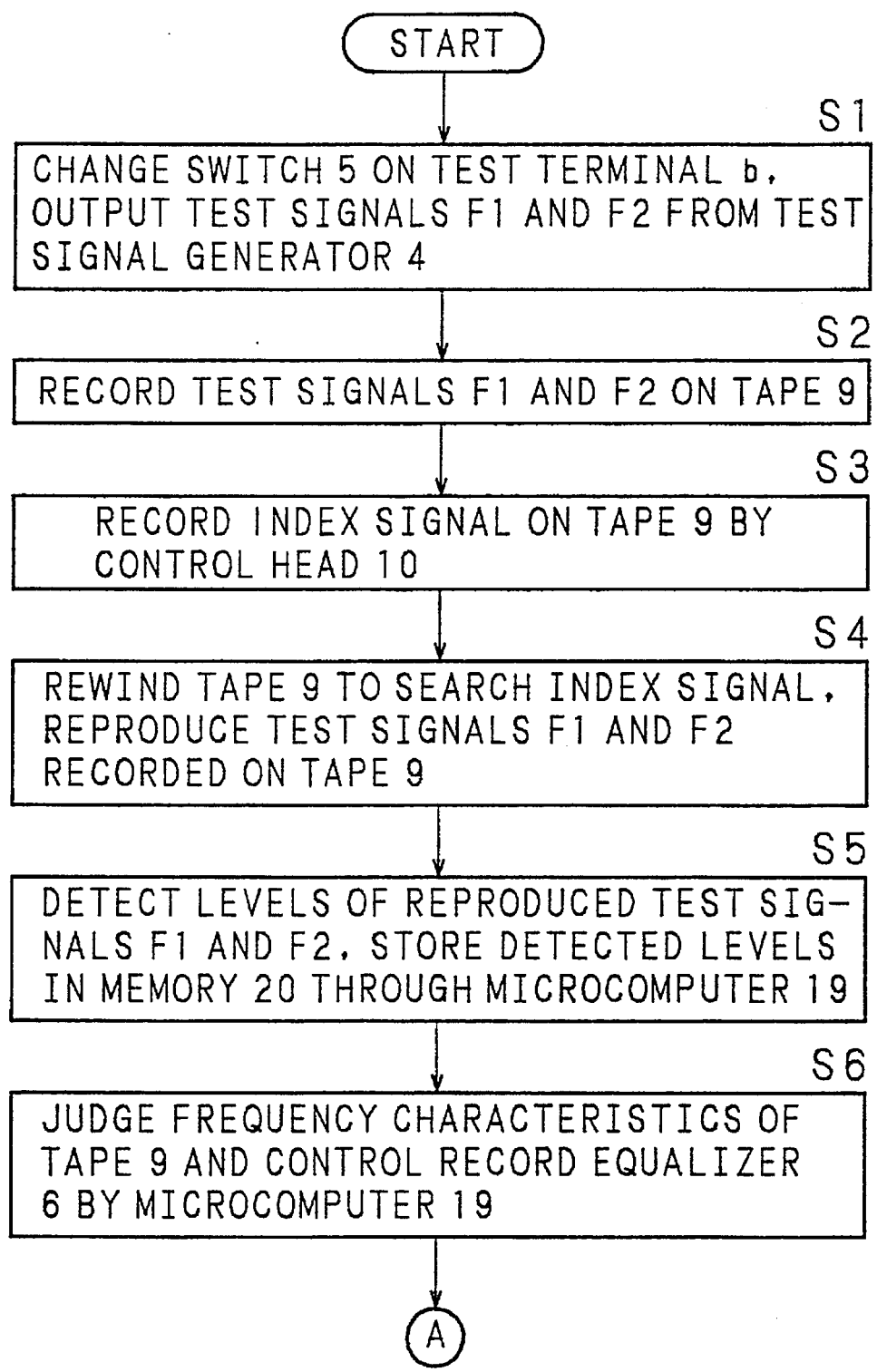
FIGS. 5(a), (b) are flowcharts showing the procedure in the magnetic recording control device according to the invention.
Figure 5B:
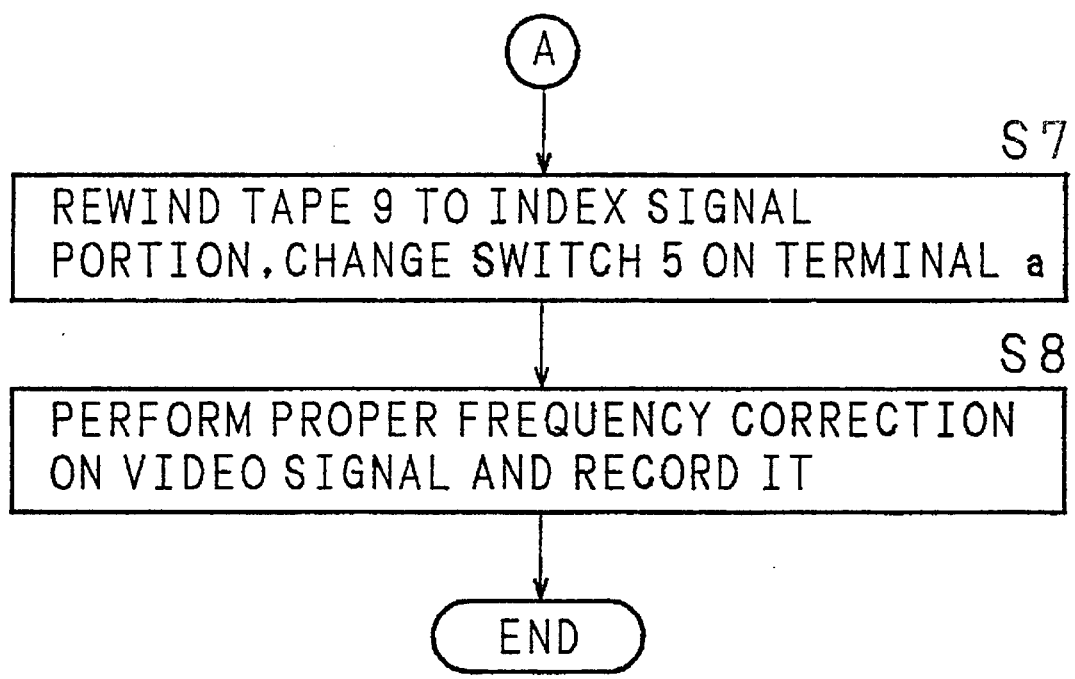

The operation of Embodiment 1 having this configuration will be described with reference to a flowchart of FIGS. 5 (a), (b) showing the procedure of the system control microcomputer 12 and tape simulator microcomputer 19. First, the user loads the magnetic tape 9 into the apparatus, and then operates a tuning button provided on a front panel (not shown) of the apparatus. In response to this operation, the system control microcomputer 12 changes the connection of the switch 5 to the test terminal b side, so that the test signals F1 and F2 are supplied from the test signal generator 4 to the record amplifier 7 (step S1). The test signals F1 and F2 are then supplied from the record amplifier 7 to the rotary magnetic head 8 to be recorded on the magnetic tape 9 (step S2).

The system control microcomputer 12 changes the connection of the switch 5 to the test terminal b side, and at the same time outputs the index signal to the CTL pulse record/ reproduction circuit 11. Concurrently with the recording of the test signals F1 and F2 on the magnetic tape 9 by the rotary magnetic head 8, the index signal is recorded on the magnetic tape 9 by the control head 10 (step S3). After the elapse of the time period, the recording of the test signals F1 and F2 is terminated.

Then, according to instructions from the system control microcomputer 12, the CTL pulse signal recorded in the control track is reproduced by the control head 10 while rewinding the magnetic tape 9, and the index signal is reproduced and detected. The reproduced index signal is sent to the system control microcomputer 12 through the CTL pulse record/reproduction circuit 11. In response to this, the system control microcomputer 12 stops the rewinding of the magnetic tape 9, and gives instructions of reproducing the recorded test signals F1 and F2 to the rotary magnetic head 8 (step S4).

Figure 6A:
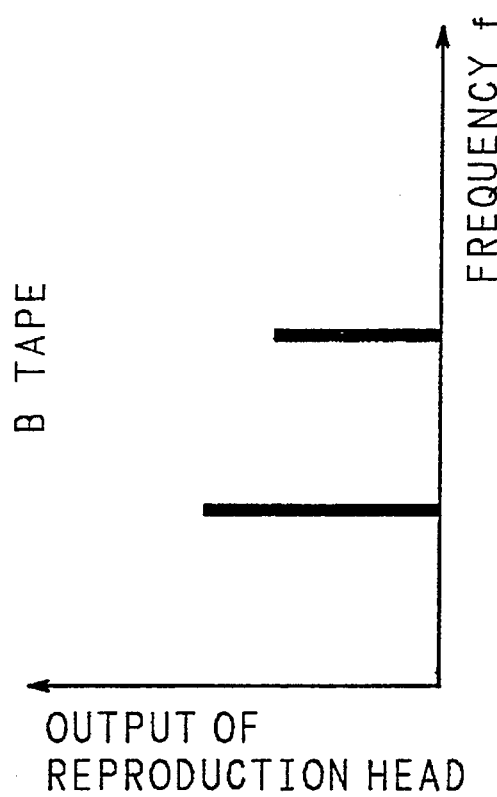
FIGS. 6(a), (b) are graphs showing reproduction head output of reproduced test signals.
Figure 6B:
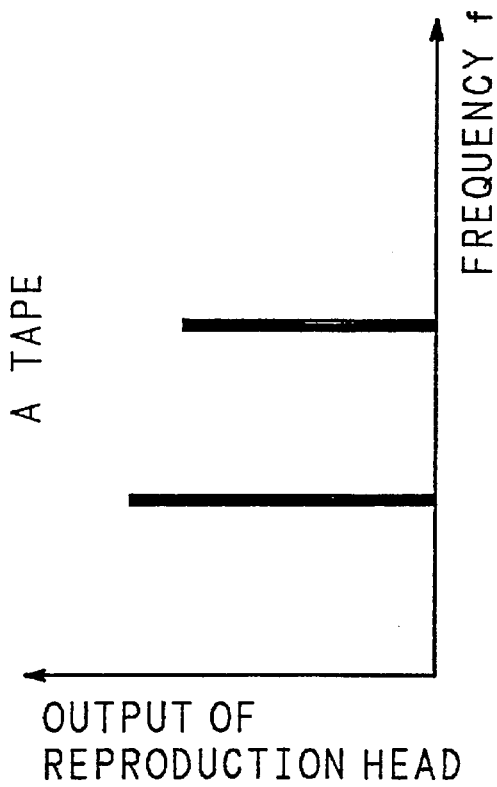

The reproduced test signals are input to the reproduction amplifier 13. The signals amplified therein are sent to the reproduction equalizer 14. The frequency characteristics of the reproduced test signals are corrected by the equalizer 14, and then supplied to the level detectors 17 and 18. In the level detector 17, a signal having a frequency spectrum of f1 is produced, and, in the level detector 18, a signal having a frequency spectrum of f2 is produced. The levels of the reproduced test signals having frequency spectrums of f1 and f2 as shown in FIGS. 6(a) and 6(b) are detected. FIG. 6(a) shows a graph showing the output of a reproduction head for test signals reproduced from A tape, and FIG. 6(b) shows a graph showing that for test signals reproduced from B tape. Data indicative of the levels of the signals are sent to the tape simulator microcomputer 19, and stored in the memory 20 (step S5).

On the basis of the reproduction levels of the test signals, the tape simulator microcomputer 19 judges the frequency characteristics with respect to the currently loaded magnetic tape 9, and supplies a signal for conducting the correction in accordance with the judged frequency characteristics, to the record equalizer 6, whereby the correction amount of the frequency characteristics of a video signal is set in the record equalizer 6 (step S6).

Next, in order to record a video signal on the magnetic tape 9, the magnetic tape 9 is rewound to a position where the index signal is recorded, and then the connection of the switch 5 is changed to the test terminal a side (step S7). A video signal to be recorded is input to the AGC 1 so that its level is made constant, and then the higher-frequency portion of the video signal is amplified by the pre-emphasis 2. The video signal is then input to the FM modulator 3 to be subjected to the FM modulation. The FM-modulated signal is supplied to the record equalizer 6 which is designed so as to conduct the frequency characteristic correction suitable for the performance of the magnetic tape 9 in accordance with a correction controlling signal from the tape simulator microcomputer 19. In the record equalizer 6, the input signal is subjected to the frequency characteristic correction. Then, the signal from the record equalizer 6 is amplified by the record amplifier 7, and then recorded on the magnetic tape 9 by the rotary magnetic head 8 (step S8).

When the thus recorded signal is to be reproduced, the signal is reproduced from the magnetic tape 9 by the rotary magnetic head 8, and amplified by the reproduction amplifier 13. After the frequency characteristics changed by the recording are corrected by the reproduction equalizer 14, the signal is demodulated by the FM demodulator 15, and then output as a reproduced video signal through the de-emphasis 16.

In the example described above, the test signals are recorded and reproduced which the magnetic tape is running for a predetermined time, however, the test signals may be recorded and reproduced while the magnetic tape is stopped.

In the device of Embodiment 1, in this way, since test signals are recorded on and reproduced from a magnetic tape to be used and the frequency characteristics are corrected in accordance with the magnetic tape, an excellent image quality in accordance with the performance of the magnetic tape can be obtained.

In the above example, two test signals of different frequencies are recorded and reproduced to detect the frequency characteristic, however, if only one test signal (especially having a higher frequency) is recorded and reproduced, the same effects can be obtained.

Embodiment 2

Next, Embodiment 2 of the invention will be described. In Embodiment 2, the configuration of Embodiment 1 is modified so that a clock signal of a microcomputer for control is used as the test signal source. Embodiment 2 is suitable for an S-VHS type magnetic recording/reproduction apparatus in which a video signal is recorded while the upper limit of the frequency bandwidth of an FM-modulated wave is shifted from 4.4 MHz in a VHS type to a higher frequency, or 7 MHz.

Figure 7:
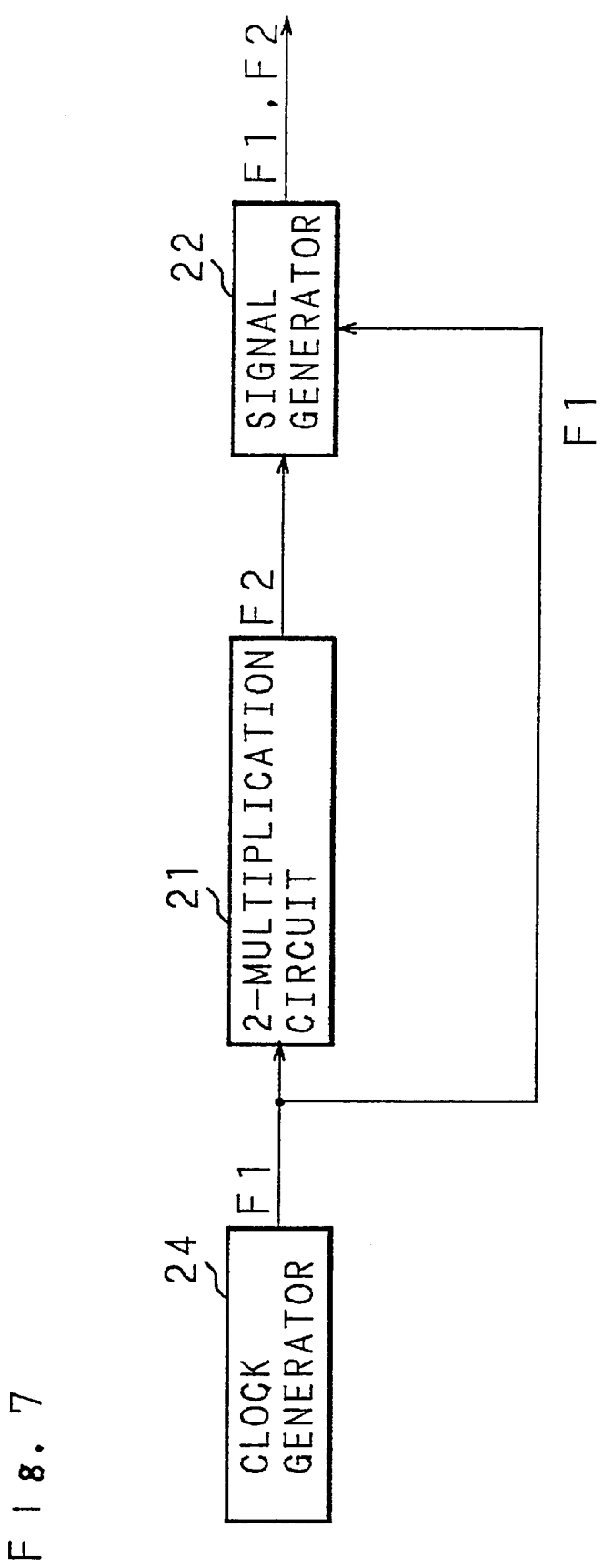
FIG. 7 is a block diagram showing the configuration of a test signal generator for generating a test signal used in the magnetic recording control device according to the invention.

FIG. 7 shows a test signal generator for generating test signals used in Embodiment 2. A clock generator 24 shown in the figure is an oscillator for generating the clock signal for the microcomputer disposed in the apparatus, and this clock signal is used as the test signal F1. The test signal F1 is supplied to a 2-multiplication circuit 21 by which the frequency of an input signal is 2-multiplied. The output signal from the 2-multiplication circuit 21 is supplied as the test signal F2 to a signal generator 22. The signal generator 22 receives the test signals F1 and F2 and outputs these test signals at the same time. When, for example, a signal of 4

MHz is used as the test signal F1, the 2-multiplication circuit 21 supplies the test signal F2 of 8 MHz to the signal generator 22. These signals are output as the signals for testing. The configuration and operation in which the frequency characteristics of a magnetic tape are judged using the test signals F1 and F2 and a signal to be recorded is corrected in accordance the frequency characteristics to be recorded on the magnetic tape are the same as those of Embodiment 1, and therefore their description is omitted.

As described above, in the device of Embodiment 2 which is for example a magnetic recording control device for S-VHS, the test signal of the higher-frequency region is recorded and reproduced, and on the basis of the reproduced test signal the frequency characteristics of S-VHS band of a used magnetic tape are judged and corrected. This enables a reproduced image to have an excellent image quality corresponding to the property of the magnetic tape for S-VHS. Since the existing clock signal used for the microcomputer is used also as the test signal F1, the configuration of the test signal generator can be simplified.

Embodiment 3

Next, Embodiment 3 of the invention will be described. In Embodiment 3, the configuration of Embodiment 1 is modified so that the clock signal for a microcomputer for control is used as the test signal source. Embodiment 3 is suitable for a VHS type magnetic recording/reproduction apparatus in which a video signal is recorded while the upper limit of the frequency bandwidth of an FM-modulated wave is set to be 4.4 MHz.

Figure 8:
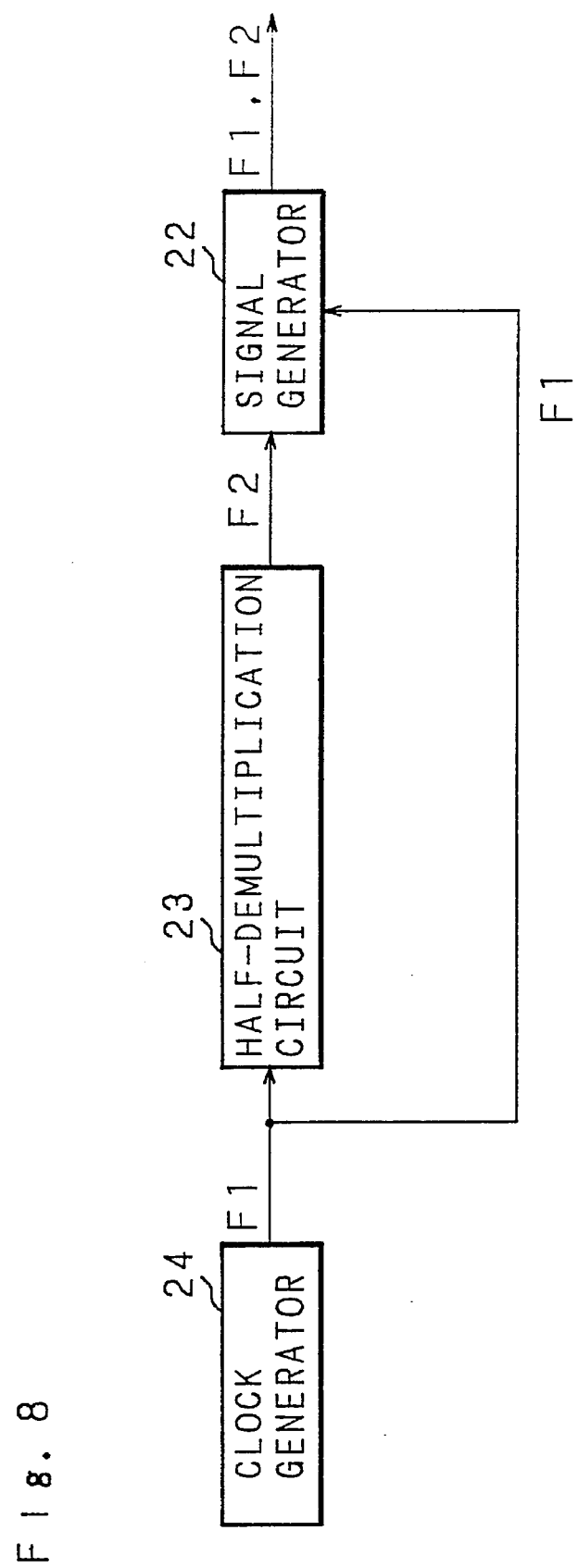
FIG. 8 is a block diagram showing the configuration of another test signal generator for generating a test signal used in the magnetic recording control device according to the invention.

FIG. 8 shows a test signal generator for generating a test signal used in Embodiment 3. A clock generator 24 shown in the figure is an oscillator for generating the clock signal for the microcomputer disposed in the apparatus, and this clock signal is used as the test signal F1. The test signal F1 is supplied to a half-demultiplication circuit 23 by which the frequency of an input signal is half-demultiplied. The output signal from the half-demultiplication circuit 23 is supplied as the test signal F2 to a signal generator 22. The signal generator 22 receives the test signals F1 and F2 and outputs these test signals at the same time. When, for example, a signal of 4 MHz is used as the test signal F1, the half-demultiplication circuit 23 supplies the test signal F2 of 2 MHz to the signal generator 22. These signals are output as the signals for testing. The configuration and operation in which the frequency characteristics of a magnetic tape are judged using the test signals F1 and F2 and a signal to be recorded is corrected in accordance the frequency characteristics to be recorded on the magnetic tape are the same as those of Embodiment 1, and therefore their description is omitted.

As described above, in the device of Embodiment 3 which is for example a magnetic recording control device for VHS, the test signal of the comparatively lower frequency is recorded and reproduced, and on the basis of the reproduced test signal the frequency characteristics of VHS band of a used magnetic tape are judged and corrected. This enables a reproduced image to have an excellent image quality corresponding to the property of the magnetic tape for VHS. Since the existing clock signal for the microcomputer is used also as the test signal F1, the configuration of the test signal generator can be simplified.

In Embodiments 2 and 3, the clock signal output from the clock generator 24 of the microcomputer is used as the test signal F1. The invention is not restricted to this. For example, the subcarrier frequency signal (3.58 MHz or 4.48 MHz) of a chrominance signal generated by a color processing unit of the magnetic recording/reproduction apparatus may be used as the test signal F1. Alternatively, another reference oscillating signal which exists in the apparatus may be used as the test signal.

As described above, in the magnetic recording control devices of Embodiments 1 to 3, a plurality of test signals of different frequencies are recorded on a used magnetic tape, the frequency characteristics of the magnetic tape are judged, and the correction of the frequency characteristics in accordance with the property of the magnetic tape is conducted based on the judgment. Therefore, the scattering of the quality of a reproduced image depending on the frequency characteristics is reduced, the reversion of an image is prevented from occurring, and a predetermined S/N ratio can be ensured, thereby enabling an excellent image quality in accordance with the performance of the magnetic tape to be obtained. Furthermore, since a signal of higher or lower frequency is used as the test signals, it is possible to obtain an excellent image quality corresponding to the property of the magnetic tape for S-VHS or VHS and so on. Moreover, since a signal existing in the magnetic recording/reproduction apparatus is used also as the test signal, the configuration of the means for generating the test signal can be simplified.

Embodiment 4

Figure 9A:
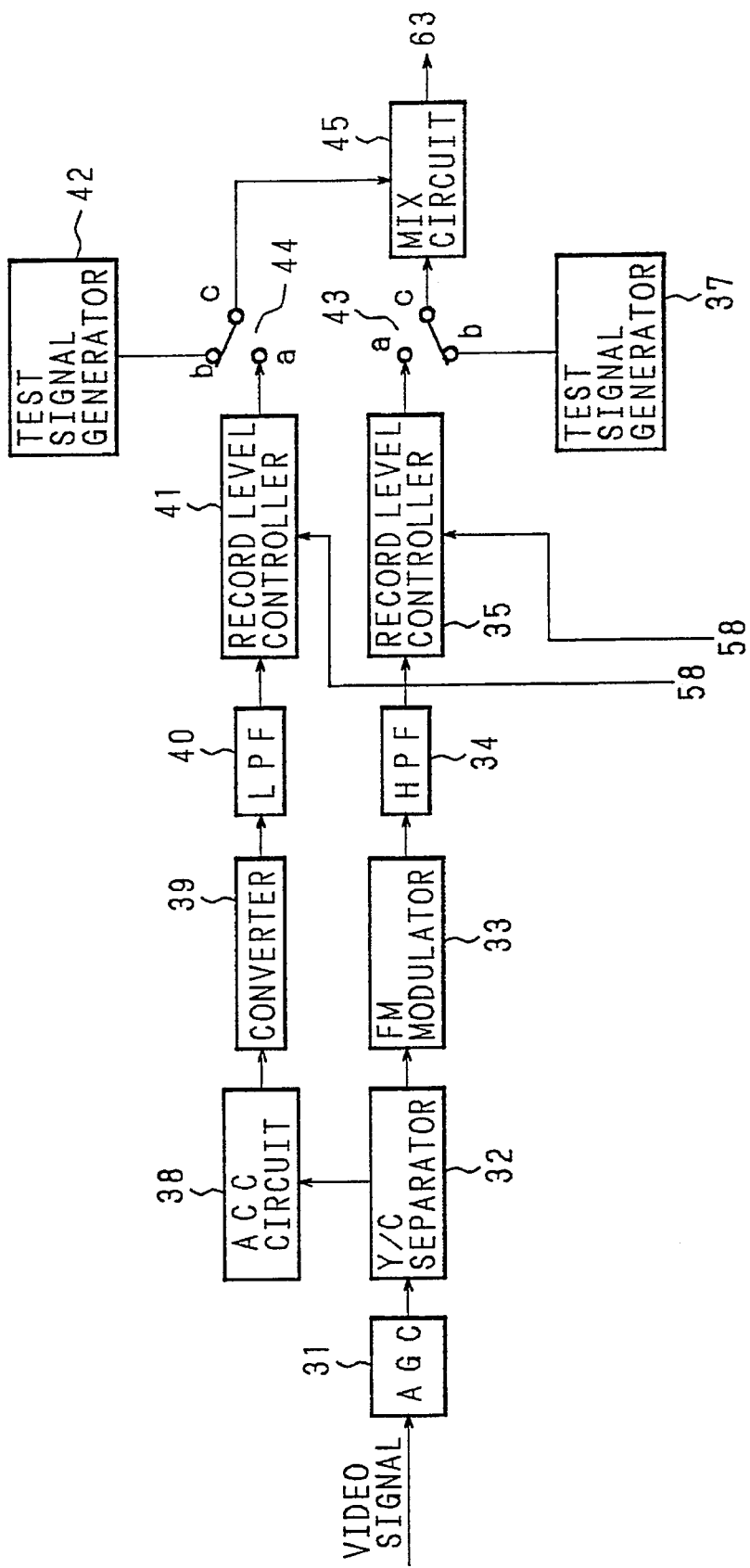
FIGS. 9(a), (b) are block diagrams showing the configuration of another magnetic recording control device according to the invention.
Figure 9B:
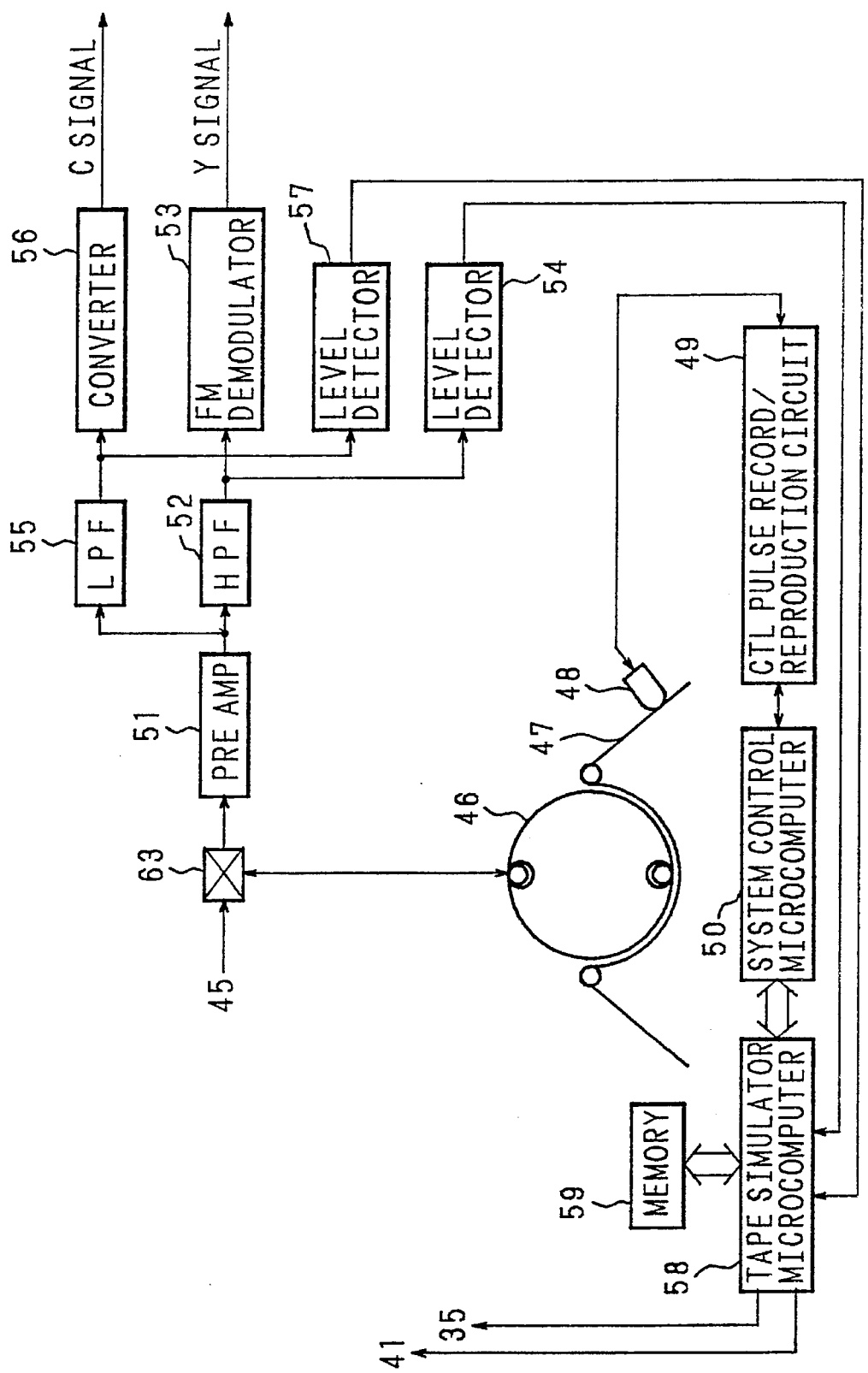

FIGS. 9(a), (b) are block diagrams showing the configuration of Embodiment 4 of the invention. In FIG. 9(a), 31 designates an AGC which adjusts an input video signal to a constant level. The output signal of the AGC 31 is supplied to a Y/C separator 32. The Y/C separator 32 separates a luminance signal and a color signal from the input video signal, and supplies the separated luminance signal to an FM modulator 33, and the separated color signal to an ACC circuit 38.

The FM modulator 33 conducts the FM modulation on the luminance signal, and outputs the modulated luminance signal to a high pass filter (HPF) 34. The luminance signal having the high frequency component which has passed through the HPF 34 is sent to a record level controller 35 in which the record level is adjusted, and thereafter the luminance signal is sent to a switch 43. The reference numeral 37 designates a test signal generator which generates a test signal corresponding to the frequency of the FM-modulated luminance signal and outputs the test signal to the switch 43. The switch 43 has fixed terminals a and b, and a movable terminal c. The fixed terminal a is coupled to the output of the record level controller 35, and the fixed terminal b to the output of the test signal generator 37. The connection of the switch 43 is changed so that the movable terminal c is connected to either of the fixed terminals a and b, and the output of the record level controller 35 or the test signal from the test signal generator 37 is selectively sent to a MIX circuit 45.

On the other hand, the ACC circuit 38 adjusts the separated color signal to a constant level, and then outputs the color signal to a converter 39. The color signal is subjected to the low frequency conversion in the converter 39, and the converted color signal is sent to a low pass filter (LPF) 40. The color signal having the low frequency component which has passed through the LPF 40 is sent to a record level controller 41 in which the record level is adjusted, and thereafter the color signal is sent to a switch 44. The reference numeral 42 designates a test signal generator which generates a test signal corresponding to the frequency of the low frequency converted color signal and outputs the test, signal to the switch 44. The switch 44 has fixed terminals a and b, and a movable terminal c. The fixed terminal a is coupled to the output of the record level controller 41, and the fixed terminal b to the output of the test signal generator 42. The connection of the switch 44 is changed so that the movable terminal c is connected to either of the fixed terminals a and b, and the output of the record level controller 41 or the test signal from the test signal generator 42 is selectively sent to the MIX circuit 45.

The MIX circuit 45 conducts the frequency multiplex by mixing the luminance signal from the record level controller 35 with the color signal from the record level controller 41, or mixing the test signals from the test signal generators 37 and 42 with each other. The MIX circuit 45, a rotary magnetic head 46, and a recording/reproduction amplifier 63 constitute the recording means. The rotary magnetic head 46 is used for the recording and reproduction, and records the output of the MIX circuit 45 which has been amplified by the recording/reproduction amplifier 63, on a magnetic tape 47 that is a magnetic recording medium.

The recorded signal is reproduced by the rotary magnetic head 46, and amplified by a preamplifier 51. The output of the preamplifier 51 is supplied to an HPF 52 and an LPF 55. The HPF 52 extracts the reproduced FH luminance signal from the reproduced signal, and sends the extracted signal to an FH demodulator 53 and a level detector 54. The LPF 55 extracts the reproduced color signal from the reproduced signal, and sends the extracted signal to a converter 56 and a level detector 57. The FM demodulator 53 demodulates the input signal (reproduced FM luminance signal) to output the original luminance signal. The converter 56 conducts the high frequency conversion on the input signal (low frequency converted color signal) to output the original color signal. The level detectors 54 and 57 detect the level of the reproduced FM luminance signal from the LPF 52 and that of the reproduced color signal from the LPF 55, and sends the detection results to a tape simulator microcomputer 58.

The tape simulator microcomputer 58 supplies the detection results of the level detectors 54 and 57 to a memory 59 which functions as the memory means, to be stored therein. On the basis of the detection results of the level detectors 54 and 57, the tape simulator microcomputer 58 controls the record level controllers 35 and 41 so as to adjust the record level of the luminance signal and the record level of the color signal. Moreover, the tape simulator microcomputer 58 functions also as the judging means for judging the electro-magnetic conversion characteristics of the rotary magnetic head 46 and magnetic tape 47, on the basis of the levels of the luminance and color signals stored in the memory 59 and the test signals of the frequencies corresponding to these luminance and color signals.

The reference numeral 48 designates a control head by which the CTL pulse signal and index signal are recorded on and reproduced from the magnetic tape 47, 49 designates a CTL pulse record/reproduction circuit which is connected to the control head 48 and generates the CTL pulse signal, and 50 designates a system control microcomputer which controls the operation of the VTR. The control head 48, the CTL pulse record/reproduction circuit 49, and the system control microcomputer 50 are the same as the control head 10, the CTL pulse record/reproduction circuit 11, and the system control microcomputer 12 which are used in Embodiment 1 (FIG. 4), and therefore their detailed description is omitted.

Figure 10:
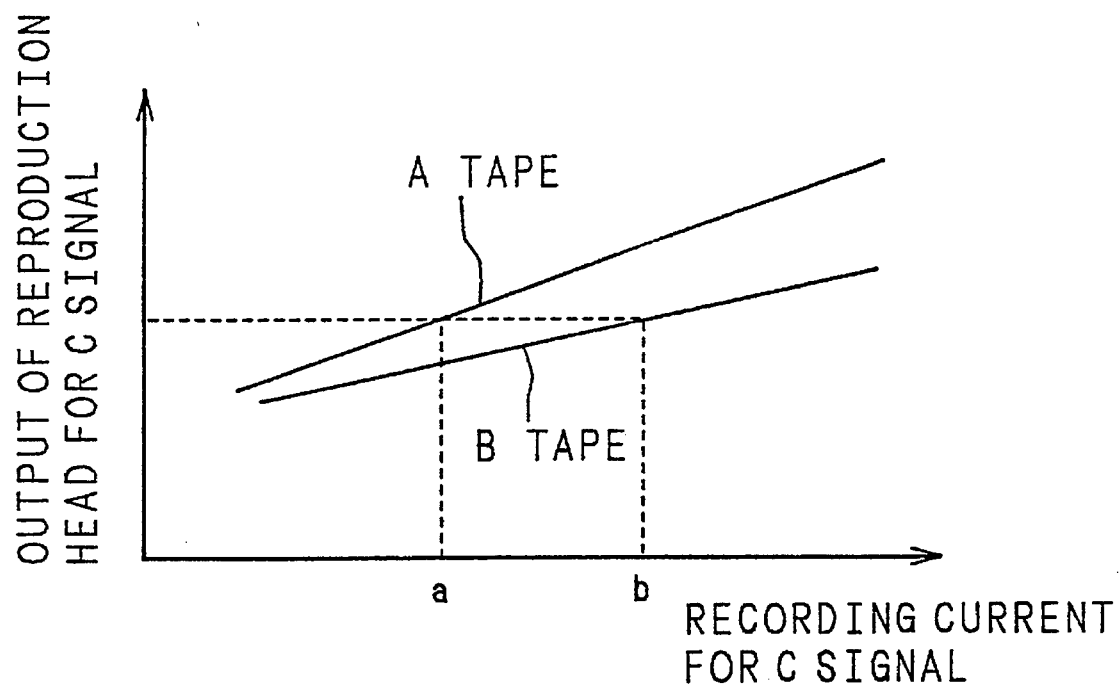
FIG. 10 is a graph showing the relationship between a recording current (level) and a reproduction head output of a color signal.
Figure 11:
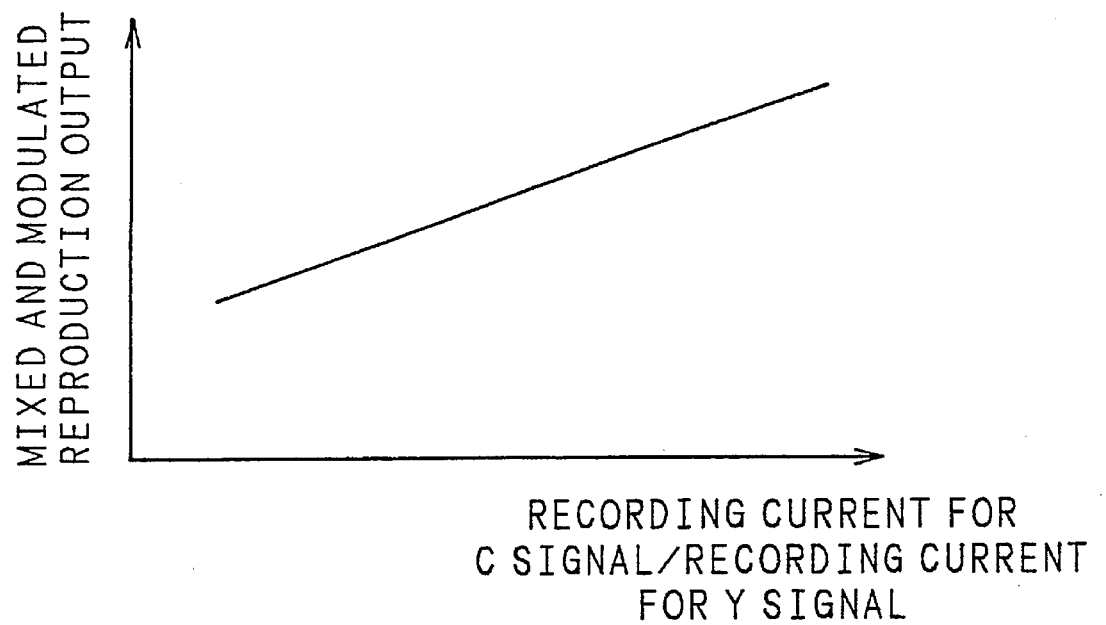
FIG. 11 is a graph showing the relationship between a recording current (level) and a cross modulation reproduction output.

FIG. 10 is a characteristic graph showing the relationship between the low frequency color signal output of the reproduction head and the record level (current) of a color signal, and FIG. 11 is a characteristic graph showing the relationship between the cross modulation reproduction output and the recording current ratio of the luminance signal and the color signal. Hereinafter, the operation will be described with reference to FIGS. 10 and 11 and a flowchart of FIG. 12.

Figure 12:
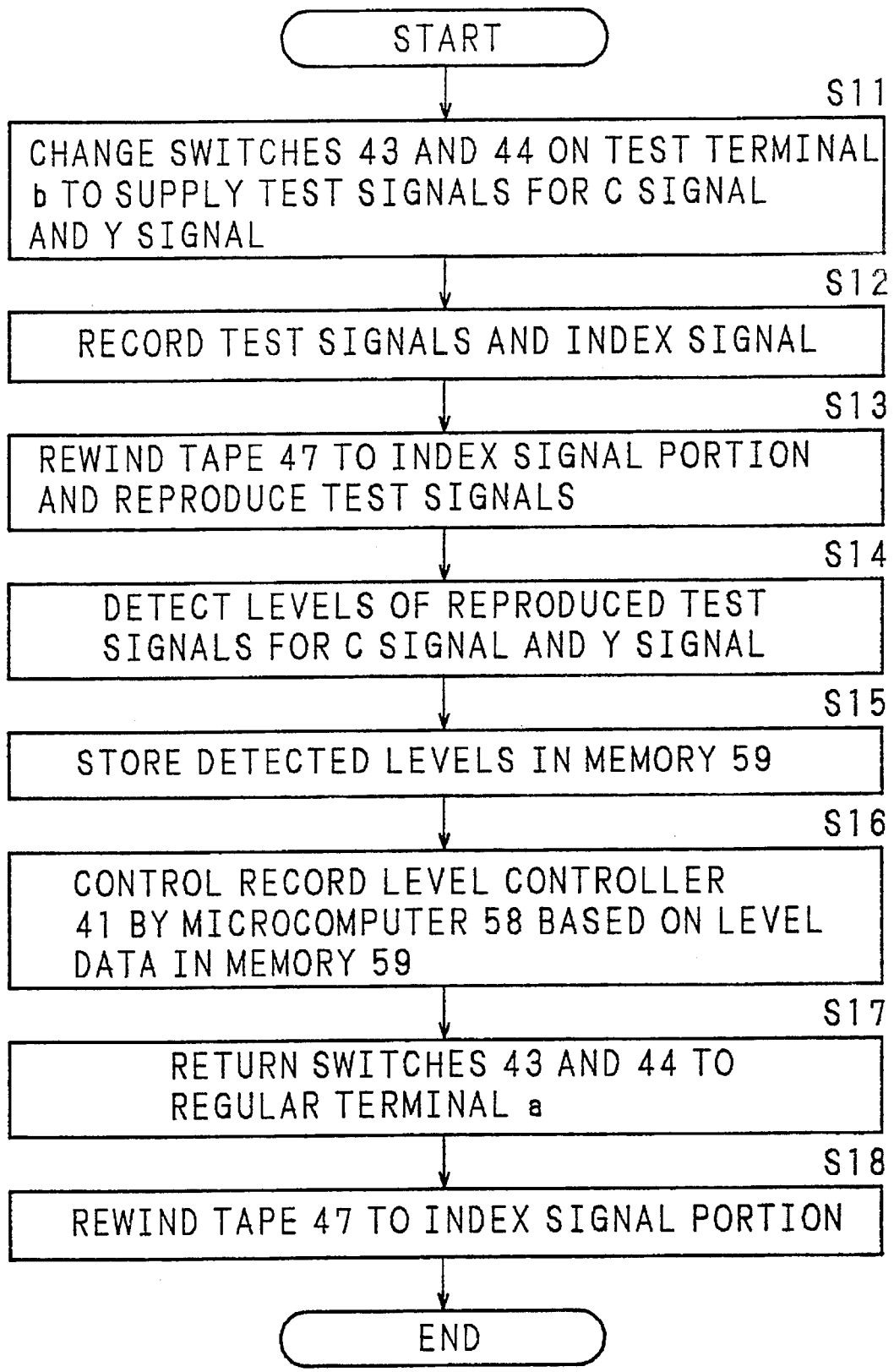
FIG. 12 is a flowchart showing the procedure in the other magnetic recording control device according to the invention.

In order to determine the electro-magnetic conversion characteristics, the tape simulator microcomputer 58 operates in accordance with the flowchart of FIG. 12. First, the connections of the switches 43 and 44 are changed so that their movable terminals c are connected to the respective fixed terminals b side (step S11). As a result, the test signal corresponding to the frequency of the FM-modulated luminance signal is supplied from the test signal generator 37 to the MIX circuit 45 through the fixed terminal b and movable terminal c of the switch 43. Similarly, the test signal corresponding to the frequency of the low frequency converted color signal is supplied from the test signal generator 42 to the MIX circuit 45 through the fixed terminal b and movable terminal c of the switch 44.

These test signals are mixed with each other or frequency multiplexed by the MIX circuit 45, and then amplified by the recording/reproduction amplifier 63. The amplified signals are supplied to the rotary magnetic lead 46 to be recorded on the magnetic tape 47. In accordance with the operation timing of the tape simulator microcomputer 58, the index signal from the CTL pulse record/reproduction circuit 49 which is controlled by the system control microcomputer 50 is recorded by time control head 48 on time magnetic tape 47 (step S12).

The magnetic tape 47 on which the test signals are recorded for the time period required for the judgment of the performance of the magnetic tape 47 is rewound to the position where the index signal is recorded, and then the test signals are reproduced (step S13). The reproduced test signals are sent through the recording/reproduction amplifier 63 to the preamplifier 51 to be amplified. In the HPF 52, the color signal band is removed and the reproduced luminance signal is extracted from the reproduced test signals, and, in the LPF 55, the reproduced color signal component is extracted. The levels of the reproduced luminance signal and reproduced color signal component are respectively detected by the level detectors 54 and 57 (step S14). The detection results of the level detectors 54 and 57 are secret, through the tape simulator microcomputer 58 to the memory 59 to be stored therein (step S15).

On the basis of the data stored in the memory 59, the tape simulator microcomputer 58 controls the record level controller 41 for the color signal so that the record level of the color signal becomes optimum with respect to A and B tapes shown in FIG. 10 (step S16).

In accordance with the above-mentioned recording of the test signals, the color signal recording current is set, and thereafter the connections of the switches 43 and 44 are changed to the normal position or their movable terminals c are connected to the respective fixed terminals a (step S17). Then, the magnetic tape 47 is rewound to the index signal position (step S18), and the normal recording is conducted.

During this normal recording, an input video signal is supplied through the AGC 31 to the Y/C separator 32 in which the input video signal is separated into a luminance signal and a color signal. The separated luminance signal is subjected to the FM modulation in the FM modulator 33, and the high frequency component passing through the HPF 34 is sent to the MIX circuit 45 through the record level controller 35 and the fixed terminal a and movable terminal c of the switch 43. The color signal separated in the Y/C separator 32 is sent through the ACC circuit 38 to the converter 39 where the color signal is subjected to the low frequency conversion. Then, the color signal is sent to the MIX circuit 45 through the record level controller 41 and the fixed terminal a and movable terminal c or the switch 44. The MIX circuit 45 conducts the frequency multiplex by mixing the FM-modulated luminance signal with the low frequency converted color signal. Thereafter, the signals are amplified by the recording/reproduction amplifier 63, and then recorded on the magnetic tape 47 by the rotary magnetic head 46.

In the reproduction process, the magnetic tape 47 is rewound by a predetermined length, and the luminance and color signals are reproduced by the rotary magnetic head 46. The reproduced luminance signal and color signals are sent through the recording/reproduction amplifier 63 to the preamplifier 51 to be amplified. The color signal component is removed in the HPF 52, and the reproduced FM luminance signal is demodulated in the FM demodulator 53 to be output as the luminance signal. The high frequency component of the reproduced color signal which has been amplified by the preamplifier 51 is removed by the LPF 55. Then, the reproduced color signal is subjected to the high frequency conversion in the converter 56 to be output as the color signal.

As described above, in Embodiment 4, a test signal corresponding to the frequency of the luminance signal and a test signal corresponding to the frequency of the color signal are frequency multiplexed at the respective record levels, and then recorded on a magnetic tape. The portion where the test signals are recorded is subjected to the reproduction, and the levels of the reproduced signals are detected. On the basis of the detected levels, the electromagnetic conversion characteristics of the low frequency converted color signal are measured, and the record level of the color signal is changed depending on the measured electro-magnetic conversion characteristics. Accordingly, the deterioration of the S/N ratio of a reproduced color signal owing to the scattering of the performance of magnetic recording media can be suppressed, and therefore it is possible to obtain an excellent image quality.

Embodiment 5

Next, Embodiment 5 of the invention will be described. The test signal recording operation of Embodiment 5 is fundamentally identical with that of above-described Embodiment 4. In Embodiment 4, when the record level of the color signal is raised in accordance with judging results to a level higher than a certain level, the cross modulation of the luminance signal and the color signal becomes greater as shown in the characteristic graph of FIG. 11, resulting in a low image quality.

In Embodiment 5, therefore, when the record level of the color signal is raised, also the record level controller 35 is controlled by the tape simulator microcomputer 58, and the record revel controllers 35 and 41 are controlled so that the cross modulation of the luminance signal and the color signal becomes optimum.

As described above, in Embodiment 5, the record levels of both the color signal and luminance signal are changed depending on the electro-magnetic conversion characteristics. Accordingly, the deterioration of the S/N ratio of reproduced color and luminance signals owing to the scattering of the performances of magnetic heads and magnetic recording media can be suppressed, and therefore it is possible to obtain an excellent image quality.

Embodiment 6

Figure 13A:
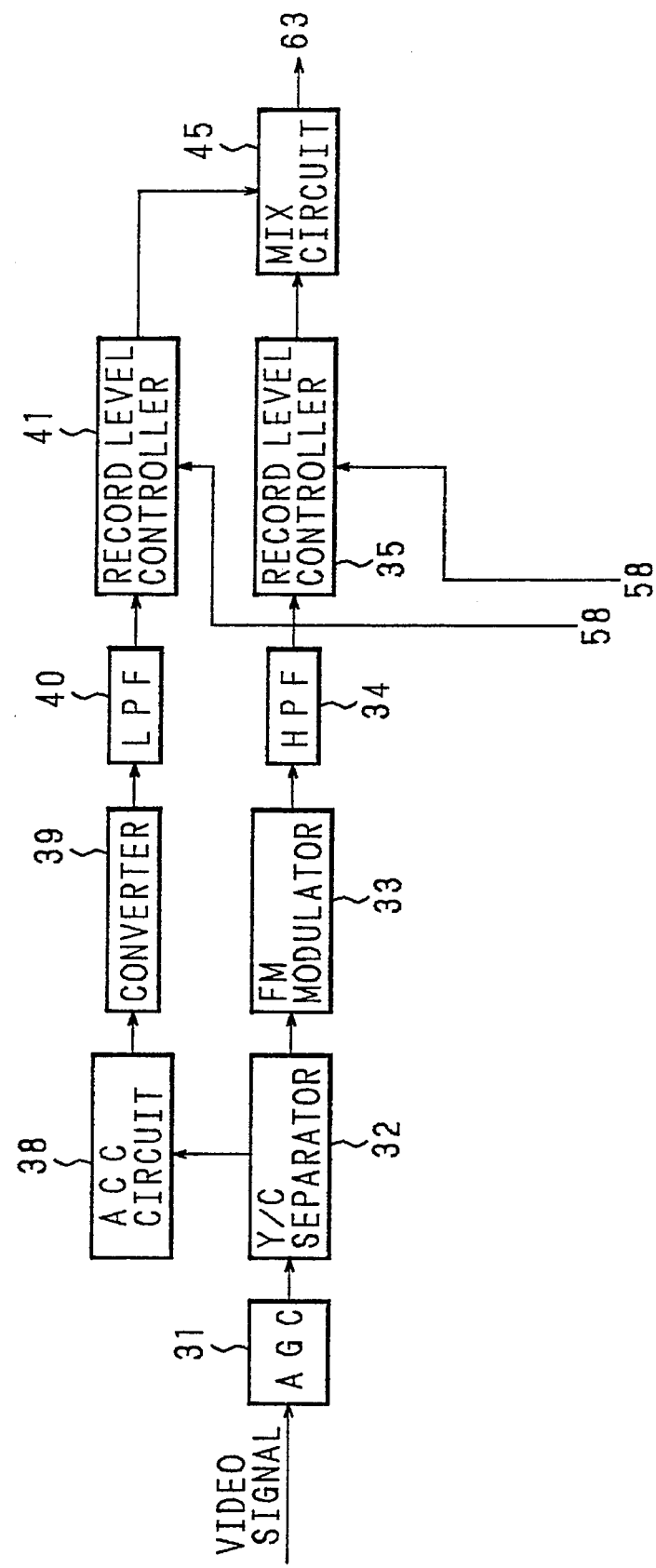
FIGS. 13(a), (b) are block diagrams showing the configuration of a further magnetic recording control device according to the invention.
Figure 13B:
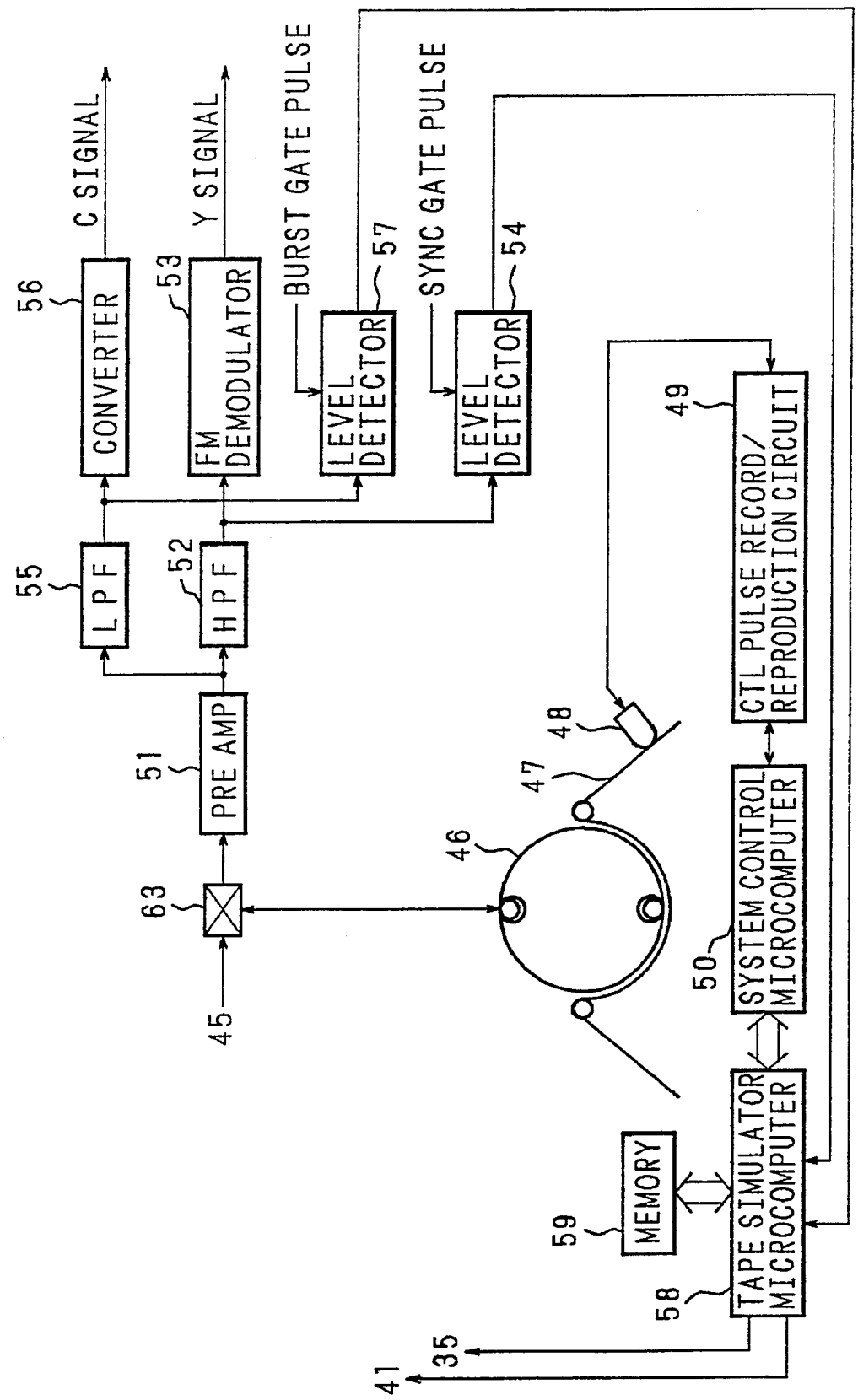

Next, Embodiment 6 of the invention will be described. FIGS. 13(a), (b) are block diagrams showing the configuration of Embodiment 6. In FIGS. 13(a), (b), the elements same as those of FIGS. 9(a), (b) are designated by the same reference numerals, and their description is omitted.

In Embodiment 6, in place of the test signals from the test signal generators 37 and 42 used in Embodiment 4 (FIGS. 9(a), (b)), the luminance and color signals of an input video signal are used. More specifically, the luminance signal of an input video signal is subjected to the FM modulation in the FM modulator 33, and then sent to the MIX circuit 45 through the LPF 34 and the record level controller 35. The color signal is sent through the ACC circuit 38 to the converter 39 where the color signal is subjected to the low frequency conversion, and then sent to the MIX circuit 45 through the LPF 40 and the record level controller 41. The MIX circuit 45 conducts the frequency multiplex by mixing the luminance signal with the color signal. Thereafter, the signals are supplied through the recording/reproduction amplifier 63 to the rotary magnetic head 46 to be recorded on the magnetic tape 47.

By colorfast, in the reproduction process, the FM-modulated luminance and low frequency converted color signals are reproduced by the rotary magnetic head 46, and sent through the recording/reproduction amplifier 63 to the preamplifier 51 to be amplified. The HPF 52 allows the reproduced FM-modulated luminance signal to pass through it. The synchronizing signal portion of the FM-modulated luminance signal is gated by a synchronizing gate pulse, and the level of the FM-modulated luminance signal is detected by the level detector 54. The LPF 55 allows the reproduced color signal which has been amplified in the preamplifier 51, to pass through it. In the level detector 57, the burst signal portion of the color signal is gated by a burst gate pulse, and the level of the color signal is detected.

The outputs of the level detectors 54 and 57 are sent to the tape simulator microcomputer 58. On the basis of the levels of the reproduced FM luminance signal and reproduced color signal, the tape simulator microcomputer 58 judges the electro-magnetic conversion characteristics of the luminance and color signals, and controls the record level controllers 35 and 41 in accordance with the judging results. After adjusting the record level of the luminance signal, therefore, the record level controller 35 supplies the luminance signal to the MIX circuit 45. Similarly, after adjusting the record level of the color signal, the record level controller 41 supplies the color signal to the MIX circuit 45. In the same manner as the recording process, the MIX circuit 45 conducts the frequency multiplex by mixing the luminance signal with the color signal, and then the signals are supplied to the rotary magnetic head 46. Other operations are the same as those of Embodiment 4 shown in FIGS. 9(a), (b).

As described above, in embodiment 6, in place of the test signals, the luminance signal and the color signal are recorded on a magnetic tape. In the reproduction process, the level of the luminance signal is detected by gating the synchronizing signal portion, and that of the color signal is detected by gating the burst signal portion. On the basis of the detected levels, the electro-magnetic conversion characteristics are judged, and the record levels of the luminance and color signals are changed in accordance with judging results. Accordingly, even when the performances of magnetic heads and magnetic tapes are scattered, the deterioration of the S/N ratio of the luminance signal and the color signal can be suppressed, and an excellent image quality can be obtained.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A magnetic recording control device which controls frequency characteristics of a video signal to be recorded on a magnetic recording medium, comprising:

means for generating a plurality of test signals of different frequencies;

means for recording said plurality of test signals and said video signal on said magnetic recording medium;

means for reproducing said plurality of test signals and said video signal recorded on said magnetic recording medium;

means for detecting a reproduction level of each of said plurality of test signals; and means for correcting frequency characteristics of said video signal into a corrected video signal prior to recording on said magnetic recording medium, on the basis of the detected reproduction levels, said means for recording receives said corrected video signal for storage in said magnetic recording medium.

2. A magnetic recording control device for a magnetic recording/reproduction apparatus where a test signal is recorded on a magnetic recording medium, the test signal is reproduced to detect characteristics of the magnetic recording medium, frequency characteristics of a video signal are corrected in accordance with the detected characteristics, and the video signal is recorded on the magnetic recording medium, said device comprising:

means for generating a plurality of test signals of different frequencies;

means for recording said plurality of test signals and said video signal on said magnetic recording medium;

means for reproducing said plurality of test signals and said vide signal recorded on said magnetic recording medium;

means for detecting a reproduction level of each of a plurality of recorded test signals;

instructing means for determining a correction amount of frequency characteristics as a function of the detected reproduction levels of said plurality of recorded test signals, and for instructing correction of said frequency characteristics; and correcting means for correcting said video signal into a corrected video signal prior to recording on said magnetic recording medium, as a function of said correction amount of frequency characteristics determined by said instructing means, said means for recording receives said corrected video signal for storage in said magnetic recording medium thereby matching recording gain to frequency characteristics of said magnetic recording medium.

3. A magnetic recording control device for a magnetic recording/reproduction apparatus where a test signal is recorded on a magnetic recording medium, the test signal is reproduced to detect characteristics of the magnetic recording medium, frequency characteristics of a video signal are corrected in accordance with the detected characteristics, and the video signal is recorded on the magnetic recording medium, said device comprising:

clock signal generating means for generating a clock signal, said clock signal being used as a first test signal;

means for generating a second test signal by multiplying said clock signal by n, where n is an integer;

means for recording said first and second test signals and said video signal on said magnetic recording medium;

means for reproducing said first and second test signals and said video signal recorded on said magnetic recording medium;

means for detecting a reproduction level of each of a recorded first and second test signal;

instructing means for determining a correction amount of frequency characteristics as a function of the detected reproduction levels of said first and second recorded test signals, and for instructing correction of said frequency characteristics; and correcting means for correcting said video signal into a corrected video signal prior to recording on said magnetic recording medium, as a function of said correction amount of frequency characteristics determined by said instructing means, said means for recording receives said corrected video signal for storage in said magnetic recording medium thereby matching recording gain to frequency characteristics of said magnetic recording medium.

4. A magnetic recording control device for a magnetic recording/reproduction apparatus where a test signal is recorded on a magnetic recording medium, the test signal is reproduced to detect characteristics of the magnetic recording medium, frequency characteristics of a video signal are corrected in accordance with the detected characteristics, and the video signal is recorded on the magnetic recording medium, said device comprising:

a color processing unit generating a chrominance signal including a subcarrier frequency signal, said subcarrier frequency signal being used as a first test signal;

means for generating a second test signal by multiplying said subcarrier frequency signal by n, where n is an integer;

means for recording said first and second test signals and said video signal on said magnetic recording medium;

means for reproducing said first and second test signals and said video signal recorded on said magnetic recording medium;

means for detecting a reproduction level of each of a first and second recorded test signals;

instructing means for determining a correction amount of frequency characteristics as a function of the detected reproduction levels of said first and second recorded test signals, and for instructing correction of said frequency characteristics; and correcting means for correcting said video signal into a corrected video signal prior to recording on said magnetic recording medium, as a function of said correction amount of frequency characteristics determined by said instructing means, said means for recording receives said corrected video signal for storage in said magnetic recording medium thereby matching recording gain to frequency characteristics of said magnetic recording medium.

5. A magnetic recording control device for a magnetic recording/reproduction apparatus where a test signal is recorded on a magnetic recording medium, the test signal is reproduced to detect characteristics of the magnetic recording medium, frequency characteristics of a video signal are corrected in accordance with the detected characteristics, and the video signal is recorded on the magnetic recording medium, said device comprising:

clock signal generating means for generating a clock signal, said clock signal being used as a first test signal;

means for generating a second test signal by dividing said clock signal by n, where n is an integer;

means for recording said first and second test signals and said video signal on said magnetic recording medium;

means for reproducing said first and second test signals and said video signal recorded on said magnetic recording medium;

means for detecting a reproduction level of each of a first and second recorded test signals;

instructing means for determining a correction amount of frequency characteristics as a function of the detected reproduction levels of said first and second recorded test signals, and for instructing correction of said frequency characteristics; and correcting means for correcting said video signal into a corrected video signal prior to recording on said magnetic recording medium, as a function of said correction amount of frequency characteristics determined by said instructing means, said means for recording receives said corrected video signal for storage in said magnetic recording medium thereby matching recording gain to frequency characteristics of said magnetic recording medium.

6. A magnetic recording control device for a magnetic recording/reproduction apparatus where a test signal is recorded on a magnetic recording medium, the test signal is reproduced to detect characteristics of the magnetic recording medium, frequency characteristics of a video signal are corrected in accordance with the detected characteristics, and the video signal is recorded on the magnetic recording medium, said device comprising;

a color processing unit generating a chrominance signal including a subcarrier frequency signal, said subcarrier frequency signal being used as a first test signal;

means for generating a second test signal by dividing said subcarrier frequency signal by n, where n is an integer;

means for recording said first and second test signals and said video signal on said magnetic recording medium;

means for reproducing said first and second test signals and said video signal recorded on said magnetic recording medium;

means for detecting a reproduction level of each of a first and second recorded test signals;

instructing means for determining a correction amount of frequency characteristics as a function of the detected reproduction levels of said first and second recorded test signals, and for instructing correction of said frequency characteristics; and correcting means for correcting said video signal into a corrected video signal prior to recording on said magnetic recording medium, as a function of said correction amount of frequency characteristics determined by said instructing means, said means for recording receives said corrected video signal for storage in said magnetic recording medium thereby matching recording gain to frequency characteristics of said magnetic recording medium.

7. A magnetic recording control device which controls a record level of a first video signal to be recorded on a magnetic recording medium, comprising:

frequency modulating means for conducting a frequency modulation on a luminance signal separated from said first video signal;

first test signal generating means for generating a first test signal of a frequency within a range of the frequency of said luminance signal which is frequency modulated in said frequency modulating means;

second test signal generating means for generating a second test signal of a frequency within a range of the frequency of a color signal which is separated from said first video signal and is subjected to a low frequency conversion;

mixing means for mixing said first and second test signals generated by said first and second test signal generating means, and for mixing said luminance signal and said color signal to form a second video signal;

recording means for recording said test signals and said second video signal on said magnetic recording medium while frequency-multiplexing said test signals;

reproducing means for reproducing said test signals and said second video signal recorded by said recording means;

detecting means for detecting reproduction levels of said test signals reproduced by said reproducing means; and correcting means for correcting a record level of said luminance signal and said color signal into a corrected luminance signal and a corrected color signal, respectively, on the basis of said reproduction levels detected by said detecting means, said recording means receives said corrected luminance signal and said corrected color signal for storage in said magnetic medium.

8. A magnetic recording control device according to claim 7, wherein said correcting means comprises:

judging means for judging electro-magnetic conversion characteristics of the low frequency converted color signal and/or the frequency modulated luminance signal, from the reproduction levels detected by said detecting means; and means for correcting a record level of the low frequency converted color signal and/or the frequency modulated luminance signal, on the basis or judging results of electro-magnetic conversion characteristics by said judging means.

9. A magnetic recording control device which controls a record level of a video signal to be recorded on a magnetic recording medium, comprising:

means for separating the video signal into a luminance signal and a color signal;

means for conducting the frequency modulation on the separated luminance signal;

first test signal generating means for generating a test signal of a frequency within a range of the frequency modulated luminance signal;

means for conducting the low frequency conversion on the separated color signal;

second test signal generating means for generating a test signal of a frequency within a range of the low frequency converted color signal;

recording means for mixing the test signals generated by said first and second test signal generating means, and for recording the test signals on the magnetic recording medium while frequency-multiplexing the test signals and for mixing the frequency modulated luminance signal with the low frequency converted color signal to create a video signal, and for recording the video signal on the magnetic recording medium while frequency multi-plexing the signals;

reproducing means for, when the test signals are recorded on the magnetic recording medium by said recording means for a predetermined time period, reproducing the test signals from the magnetic recording medium;

detecting means for detecting reproduction levels of the reproduced test signals;

memory means for storing the reproduction levels of the reproduced test signals detected by said detecting means;

judging means for judging electro-magnetic conversion characteristics of the low frequency converted color signal, from the contents of said memory means; and correcting means for correcting a record level of the low frequency converted color signal, on the basis of judging results by said judging means.

10. A magnetic recording control device according to claim 9, wherein said judging means further judges electro-magnetic conversion characteristics of the frequency modulated luminance signal, from the contents of said memory means, and said correcting means further corrects a record level of the frequency modulated luminance signal, on the basis of judging results by said judging means.

11. A magnetic recording control device which controls a record level of a video signal to be recorded on a magnetic recording medium, comprising:

frequency modulating means for conducting the frequency modulation on a luminance signal separated from the video signal;

converting means for low frequency converting a color signal separated from the video signal;

recording means for mixing the frequency modulated luminance signal with the low frequency converted color signal to create a video signal, and for recording the video signal on the magnetic recording medium while frequency-multiplexing the video signal;

first detecting means for detecting a reproduction level of the luminance signal by gating a synchronizing signal portion while performing the reproduction on the magnetic recording medium on which the recording has been conducted by said recording means;

second detecting means for detecting a reproduction level of the color signal by gating a burst signal portion while performing the reproduction on the magnetic recording medium on which the recording has been conducted by said recording means;

memory means for storing the reproduction level of the luminance signal detected by said first detecting means, and the reproduction level of the color signal detected by said second detecting means;

judging means for judging electro-magnetic conversion characteristics of the luminance signal and color signal, from the contents of said memory means; and means for changing a record level of the frequency modulated luminance signal and a record level of the low frequency converted color signal, on the basis of judging results of electro-magnetic conversion characteristics of the luminance signal and color signal by said judging means.

12. A method for recording a video image stored on a tape, comprising the steps of:

(a) recording a multiple frequency test signal onto said tape, said multiple frequency test signal including at least a first frequency part and a second frequency part;

(b) reproducing said multiple frequency test signal from said tape;

(c) separating said first frequency part from said multiple frequency test signal reproduced in said step (b) to create a first frequency signal;

(d) separating said second frequency part from said multiple frequency test signal reproduced in said step (b) to create a second frequency signal;

(e) detecting levels of said first and second frequency signals;

(f) adjusting a record level of image signals prior to recording of said image signals on said tape as a function of said levels of said first and second frequency signals detected in said step (e); and (g) recording said image signals adjusted in said step (f) on said tape.

13. The method of claim 12, further including:

(h) concurrent with step (a), recording an index signal on the tape;

(i) reading the index signal from the tape while rewinding the tape; and (j) stopping rewinding of the tape in response to the index signal read in step (i).

14. The method of claim 12, wherein step (a) includes generating a second frequency part by multiplying the frequency of the first frequency part by two.

15. The method of claim 12, wherein step (a) includes generating a second frequency part by dividing the frequency of the first frequency part by two.

16. The method of claim 12, wherein step (a) includes:

(a1) generating the first frequency signal having a frequency within the range of a luminance signal frequency;

(a2) generating the second frequency signal having a frequency within the range of a color signal frequency; and (a3) multiplexing the first and second frequency signals.

17. The method of claim 16, wherein step (a1) includes generating the first frequency signal utilizing a first test signal generator circuit; and step (a2) includes generating the second frequency signal by utilizing a second test signal generator circuit.

18. The method of claim 16, wherein said step (a1) includes the substep of filtering said first frequency signal from a luminance signal, and said step (a2) includes the substep of filtering said second frequency signal from a color signal.

19. The method of claim 18, wherein said step (a1) includes the substep of filtering said first frequency signal from said luminance signal with a high pass filter; and said step (a2) includes the substep of filtering said second frequency signal from said color signal with a low pass filter.

20. The method of claim 12, wherein step (a) includes recording a multiple frequency test signal having a signal of the first frequency mixed with a signal of the second frequency.

21. The method of claim 12, wherein step (f) includes adjusting record levels of a color signal and a luminance signal.

22. The method of claim 16, wherein step (f) includes adjusting record levels of a luminance signal and a color signal in response to said levels of said first and second frequency signals detected in said step (e), respectively.

23. A video tape recorder comprising:

a record equalizer, having an input video signal as an input and having an equalized video signal as an output;

a multiple frequency test signal generator, having a multiple frequency test signal as an output;

at least one switch, having an input connected to one of said record equalizer and said multiple frequency test signal generator and having a switch output signal;

at least one head, receiving and recording the switch output signal, and reading a recorded signal on the tape to output a head output signal;

a reproduction equalizer, having the head output signal as an input and having an equalized head output signal as an output;

at least first and second level detectors, having the equalized head output signal as an input, said first level detector detecting a first frequency record level and outputting a first frequency record level signal indicative of the record level of a signal of a first frequency, said second level detector detecting a second frequency record level and outputting a second frequency record level signal indicative of the record level of a second frequency; and a level determiner, having the first and second frequency record level signals as inputs, determining the record levels of multiple frequencies of the video input signal as a function of the first and second frequency record level signals and having a level output signal, connected to said record equalizer.

24. The video tape recorder of claim 23, wherein said record equalizer includes at least first and second record level controllers, each record level controller being responsive to said level output signal to control the record level of a different frequency range of the video input signal.

25. The video tape recorder of claim 24, wherein said first record level controller controls the record level of a color signal frequency range; and said second record level controller controls the record level of a luminance signal frequency range.

26. The video tape recorder of claim 25, wherein said record equalizer substantially consists of said first and second record level controllers.

27. The video tape recorder of claim 26 including only two level detectors.

28. The video tape recorder of claim 23 wherein said multiple frequency test signal generator has an output of signals of the first and second frequency multiplexed.

29. The video tape recorder of claim 25, further comprising:

a mix circuit interposed between said at least one switch, and said at least one head; and wherein said multiple frequency test signal generator has an output of a signal of the first frequency and a signal of the second frequency;

said at least one switch includes only first and second switches, said first switch controlled to connect the signal of the first frequency from said multiple frequency test signal generator and the color signal from said first record level controller to said mix circuit, and said second switch controlled to connect the signal of the second frequency from said multiple frequency test signal generator and the luminance signal from said second record level controller to said mix circuit; and said mix circuit mixes the signals of the first and second frequencies and mixes the color signal and the luminance signal.

30. The video tape recorder of claim 28, wherein said level determiner includes a microcomputer and a memory storing the first and second frequency record levels.

31. The video tape recorder of claim 24, wherein said reproduction equalizer includes a low pass filter and a high pass filter; and said first and second level detectors respectively receive an output from said low pass filter and said high pass filter.

32. A video tape recorder, comprising:

a record equalizer, having a multiple frequency test signal and an input video signal as an input and having an equalized signal as an output;

at least one head, receiving and recording the equalized signal, and reading a recorded signal on the tape to output a head output signal;

a reproduction equalizer, having the head output signal as an input and having an equalized head output signal as an output;

at least first and second level detectors, having the equalized head output signal as an input, said first level detector detecting a first frequency record level and outputting a first frequency record level signal indicative of the record level of a signal of a first frequency, said second level detector detecting a second frequency record level and outputting a second frequency record level signal indicative of the record level of a second frequency; and a level determiner, having the first and second frequency record level signals as inputs, determining the record levels of multiple frequencies of the video input signal as a function of at least the first and second frequency record level signals and having a level output signal, connected to said record equalizer;

wherein said record equalizer adjusts the level of recording of multiple frequency ranges of the input video signal in response to the level output signal.

33. A magnetic recording control device for correcting frequency characteristics of a video signal to be recorded on a magnetic recording medium, comprising:

a test signal generator generating test signals based on a clock signal;

recording unit recording said test signals on said magnetic recording medium;

reproducing unit reproducing said recorded test signals;

detecting unit detecting reproduction levels of said reproduced test signals; and correcting unit correcting frequency characteristics of said video signal based on said detected reproduction levels, wherein said recording unit records said corrected video signal on said magnetic recording medium.

34. A magnetic recording control device for correcting frequency characteristics of a video signal to be recorded on a magnetic recording medium, comprising:

a test signal generator generating test signals based on a subcarrier frequency signal of a chrominance signal;

recording unit recording said test signals on said magnetic recording medium;

reproducing unit reproducing said recorded test signals;

detecting unit detecting reproduction levels of said reproduced test signals; and correcting unit correcting frequency characteristics of said video signal based on said detected reproduction levels, wherein said recording unit records said corrected video signal on said magnetic recording medium.

35. A method for controlling frequency characteristics of a video signal to be recorded on a magnetic recording medium, comprising:

generating a plurality of test signals of different frequencies;

recording said plurality of test signals and said video signal on said magnetic recording medium;

reproducing said plurality of test signals and said video signal recorded on said magnetic recording medium;

detecting a reproduction level of each of said plurality of test signals; and correcting frequency characteristics of said video signal into a corrected video signal prior to recording on said magnetic recording medium, on the basis of said detected reproduction levels, wherein said corrected video signal is received for storage in said magnetic recording medium in said recording step.

36. A method for controlling a magnetic recording/reproduction apparatus, comprising:

generating a plurality of test signals of different frequencies;

recording said plurality of test signals and a video signal on said magnetic recording medium;

reproducing said plurality of test signals and said video signal recorded on said magnetic recording medium;

detecting a reproduction level of each of a plurality of recorded test signals;

determining a correction amount of frequency characteristics as a function of said detected reproduction levels of said plurality of recorded test signals;

instructing correction of said frequency characteristics; and correcting said video signal into a corrected video signal prior to recording on said magnetic recording medium, as a function of said determined correction amount of frequency characteristics, wherein said corrected video signal is received for storage in said magnetic recording medium in said recording step thereby matching recording gain to frequency characteristics of said magnetic recording medium.

37. A method for controlling a magnetic recording/reproduction apparatus, comprising:

generating a clock signal, said clock signal being used as a first test signal;

generating a second test signal by multiplying said clock signal by n, where n is an integer;

recording said first and second test signals and a video signal on said magnetic recording medium;

reproducing said first and second test signals and said video signal recorded on said magnetic recording medium;

detecting a reproduction level of each of a recorded first and second test signals;

determining a correction amount of frequency characteristics as a function of said detected reproduction levels of said first and second recorded test signals, and instructing correction of said frequency characteristics; and correcting said video signal into a corrected video signal prior to recording on said magnetic recording medium, as a function of said determined correction amount of frequency characteristics, wherein said corrected video signal is received for storage in said magnetic recording medium in said recording step thereby matching recording gain to frequency characteristics of said magnetic recording medium.

38. A method for controlling a magnetic recording/reproduction apparatus, comprising:

generating a chrominance signal including a subcarrier frequency signal, said subcarrier frequency signal being used as a first test signal;

generating a second test signal by multiplying said subcarrier frequency signal by n, where n is an integer;

recording said first and second test signals and a video signal on said magnetic recording medium;

reproducing said first and second test signals and said video signal recorded on said magnetic recording medium;

a detecting unit detecting a reproduction level of each of a first and second recorded test signals;

determining a correction amount of frequency characteristics as a function of said detected reproduction levels of said first and second recorded test signals, and instructing correction of said frequency characteristics; and correcting said video signal into a corrected video signal prior to recording on said magnetic recording medium, as a function of said determined correction amount of frequency characteristics, wherein said corrected video signal is received for storage in said magnetic recording medium in said recording step thereby matching recording gain to frequency characteristics of said magnetic recording medium.

39. A method for controlling a magnetic recording/reproduction apparatus, comprising:

generating a clock signal, said clock signal being used as a first test signal;

generating a second test signal by dividing said clock signal by n, where n is an integer;

recording said first and second test signals and a video signal on said magnetic recording medium;

reproducing said first and second test signals and said video signal recorded on said magnetic recording medium;

detecting a reproduction level of each of a first and second recorded test signals;

determining a correction amount of frequency characteristics as a function of said detected reproduction levels of said first and second recorded test signals, instructing correction of said frequency characteristics; and correcting said video signal into a corrected video signal prior to recording on said magnetic recording medium, as a function of said determined correction amount of frequency characteristics, wherein said corrected video signal is received for storage in said magnetic recording medium thereby matching recording gain to frequency characteristics of said magnetic recording medium.

40. A method for controlling a magnetic recording/reproduction apparatus, comprising:

generating a chrominance signal including a subcarrier frequency signal, said subcarrier frequency signal being used as a first test signal;

generating unit generating a second test signal by dividing said subcarrier frequency signal by n, where n is an integer;

recording said first and second test signals and a video signal on said magnetic recording medium;

reproducing said first and second test signals and said video signal recorded on said magnetic recording medium;

detecting a reproduction level of each of a first and second recorded test signals;

determining a correction amount of frequency characteristics as a function of said detected reproduction levels of said first and second recorded test signals, instructing correction of said frequency characteristics; and correcting said video signal into a corrected video signal prior to recording on said magnetic recording medium, as a function of said determined correction amount of frequency characteristics, wherein said corrected video signal is received for storage in said magnetic recording medium in said recording step thereby matching recording gain to frequency characteristics of said magnetic recording medium.

41. A magnetic recording/reproduction apparatus, comprising:

an input device receiving a video signal to be recorded on a recording medium; and a magnetic recording control device controlling frequency characteristics of said video signal, said magnetic recording control device including, a test signal generating unit generating a plurality of test signals of different frequencies, a recording unit recording said plurality of test signals and said video signal on said magnetic recording medium, a reproducing unit reproducing said plurality of test signals and said video signal recorded on said magnetic recording medium, a detecting unit detecting a reproduction level of each of said plurality of test signals, and a correcting unit correcting frequency characteristics of said video signal into a corrected video signal prior to recording on said magnetic recording medium, on the basis of the detected reproduction levels, said recording unit receives said corrected video signal for storage in said magnetic recording medium.

42. A magnetic recording/reproduction apparatus, comprising:

an input device receiving a video signal to be recorded on a recording medium; and a magnetic recording control device controlling frequency characteristics of said video signal said magnetic recording device including, a test signal generating unit generating a plurality of test signals of different frequencies, a recording unit recording said plurality of test signals and said video signal on said magnetic recording medium, a reproducing unit reproducing said plurality of test signals and said video signal recorded on said magnetic recording medium, a detecting unit detecting a reproduction level of each of a plurality of recorded test signals, an instructing unit determining a correction amount of frequency characteristics as a function of said detected reproduction levels of said plurality of recorded test signals, and instructing correction of said frequency characteristics, and a correcting unit correcting said video signal into a corrected video signal prior to recording on said magnetic recording medium, as a function of said correction amount of frequency characteristics determined by said instructing unit, said recording unit receives said corrected video signal for storage in said magnetic recording medium thereby matching recording gain to frequency characteristics of said magnetic recording medium.

43. A magnetic recording/reproduction apparatus, comprising:

an input device receiving a video signal to be recorded on a recording medium; and a magnetic recording control device controlling frequency characteristics of said video signal said magnetic recording device including, a clock signal generator generating a clock signal, said clock signal being used as a first test signal, a test signal generator generating a second test signal by multiplying said clock signal by n, where n is an integer, a recording unit recording said first and second test signals and said video signal on said magnetic recording medium, a reproducing unit reproducing said first and second test signals and said video signal recorded on said magnetic recording medium, a detecting unit detecting a reproduction level of each of a recorded first and second test signals, an instructing unit for determining a correction amount of frequency characteristics as a function of said detected reproduction levels of said first and second recorded test signals, and instructing correction of said frequency characteristics, and a correcting unit correcting said video signal into a corrected video signal prior to recording on said magnetic recording medium, as a function of said correction amount of frequency characteristics determined by said instructing unit, said recording unit receives said corrected video signal for storage in said magnetic recording medium thereby matching recording gain to frequency characteristics of said magnetic recording medium.

44. A magnetic recording/reproduction apparatus, comprising:

an input device receiving a video signal to be recorded on a recording medium; and a magnetic recording control device controlling frequency characteristics of said video signal said magnetic recording device including, a color processing unit generating a chrominance signal including a subcarrier frequency signal, said subcarrier frequency signal being used as a first test signal, a test signal generating unit generating a second test signal by multiplying said subcarrier frequency signal by n, where n is an integer, a recording unit recording said first and second test signals and said video signal on said magnetic recording medium, a reproducing unit reproducing said first and second test signals and said video signal recorded on said magnetic recording medium, a detecting unit detecting a reproduction level of each of a first and second recorded test signals, an instructing unit determining a correction amount of frequency characteristics as a function of said detected reproduction levels of said first and second recorded test signals, and instructing correction of said frequency characteristics, and a correcting unit correcting said video signal into a corrected video signal prior to recording on said magnetic recording medium, as a function of said correction amount of frequency characteristics determined by said instructing unit, said recording unit receives said corrected video signal for storage in said magnetic recording medium thereby matching recording gain to frequency characteristics of said magnetic recording medium.

45. A magnetic recording/reproduction apparatus, comprising:

an input device receiving a video signal to be recorded on a recording medium; and a magnetic recording control device controlling frequency characteristics of said video signal, said magnetic recording device including, a clock signal generator generating a clock signal, said clock signal being used as a first test signal, a test signal generating unit generating a second test signal by dividing said clock signal by n, where n is an integer, a recording unit recording said first and second test signals and said video signal on said magnetic recording medium, a reproducing unit reproducing said first and second test signals and said video signal recorded on said magnetic recording medium, a detecting unit detecting a reproduction level of each of a first and second recorded test signals, an instructing unit determining a correction amount of frequency characteristics as a function of said detected reproduction levels of said first and second recorded test signals, and instructing correction of said frequency characteristics, and a correcting unit correcting said video signal into a corrected video signal prior to recording on said magnetic recording medium, as a function of said correction amount of frequency characteristics determined by said instructing unit, said recording unit receives said corrected video signal for storage in said magnetic recording medium thereby matching recording gain to frequency characteristics of said magnetic recording medium.

46. A magnetic recording/reproduction apparatus, comprising:

an input device receiving a video signal to be recorded on a recording medium; and a magnetic recording control device controlling frequency characteristics of said video signal, said magnetic recording device including, a color processing unit generating a chrominance signal including a subcarrier frequency signal, said subcarrier frequency signal being used as a first test signal, a test signal generating unit generating a second test signal by dividing said subcarrier frequency signal by n, where n is an integer, a recording unit recording said first and second test signals and said video signal on said magnetic recording medium, a reproducing unit reproducing said first and second test signals and said video signal recorded on said magnetic recording medium, a detecting unit detecting a reproduction level of each of a first and second recorded test signals, an instructing unit determining a correction amount of frequency characteristics as a function of said detected reproduction levels of said first and second recorded test signals, and instructing correction of said frequency characteristics, and a correcting unit correcting said video signal into a corrected video signal prior to recording on said magnetic recording medium, as a function of said correction amount of frequency characteristics determined by said instructing unit, said recording unit receives said corrected video signal for storage in said magnetic recording medium thereby matching recording gain to frequency characteristics of said magnetic recording medium.

\* \* \* \* \*